United States Patent [19]

Bishop et al.

[11] Patent Number: 4,958,284

[45] Date of Patent: Sep. 18, 1990

[54] OPEN ENDED QUESTION ANALYSIS SYSTEM AND METHOD

[75] Inventors: Lawrence C. Bishop, Hauppauge; George Ziegler, East Meadow, both of N.Y.

[73] Assignee: NPD Group, Inc., Port Washington, N.Y.

[21] Appl. No.: 280,670

[22] Filed: Dec. 6, 1988

[51] Int. Cl.$^5$ .............................................. G06F 15/21
[52] U.S. Cl. ..................................... 364/419; 364/401
[58] Field of Search ................... 364/401, 419; 455/2; 434/322, 353

[56] References Cited

U.S. PATENT DOCUMENTS

| | | | |
|---|---|---|---|
| 4,270,182 | 5/1981 | Asija | 364/900 |
| 4,586,160 | 4/1986 | Amano et al. | 364/900 |
| 4,745,468 | 5/1988 | Von Kohorn | 358/84 |
| 4,876,592 | 10/1989 | Von Kohorn | 358/84 |

FOREIGN PATENT DOCUMENTS 0059277 4/1982 Japan .................................... 364/419

OTHER PUBLICATIONS

Krutch, *Experiments in Artificial Intelligence for Small Computers*, Howard W. Sams & Co., Inc., 1981, pp. 85–105.
Barr et al., *The Handbook of Artificial Intelligence*, vol. I, HeurisTech Press, 1981, pp. 281–321.
Winston, *Artificial Intelligence*, Addison–Wesley Publishing Co., 1984, pp. 291–307.
Andriole, *Applications in Artificial Intelligence*, Petrocelli Books, Inc., 1985, pp. 149–191.

*Primary Examiner*—Jerry Smith
*Assistant Examiner*—David Huntley
*Attorney, Agent, or Firm*—Bryan, Cave, McPheeters & McRoberts

[57] ABSTRACT

A method and system for data processing open-ended respondent answers to open-ended questions provides reproducible categorized dynamically variable coding of the open-ended respondent answers to the open-ended questions. The data processor (200) has an updateable retrievable word dictionary fo words stored therein with the open-ended answers comprising words. The open-ended answers are input to the data processor (102,106) and classified (108) into corresponding word types such as keywords, modifiers, skip words, connectors, and negative words, with the combined keywords and associated modifiers forming key phrases. The input words are convered (112) into corresponding binary coded words for providing a binary defined sentence corresponding to the input open-ended respondent answer. The binary defined sentence is scanned and any keywords and associated modifiers are extracted (114) to create a retrievable file comprising key phrases formed from the extracted keywords and associated modifiers, and the keywords per se (116). The key phrases are sorted in the created file (118) and the occurrences of the sorted key phrases are counted and duplicates eliminated in order to provide a net key phrase file (120). The net key phrase file is displayed to the operator (122) who then groups the displayed net key phrases into a coding structure (124) which is stored and can be updated or modified under control of the operator.

51 Claims, 16 Drawing Sheets

CLOSED-ENDED QUESTION

1. PLEASE CHECK THE ONE BOX THAT BEST DESCRIBES HOW WELL YOU LIKED THE PRODUCT OVERALL:

- LIKE EXTREMELY............ ☐ 1
   - LIKE VERY MUCH............ ☐ 2
   - LIKE MODERATELY........... ☐ 3
   - LIKE SLIGHTLY............. ☐ 4
   - NEITHER LIKE NOR DISLIKE... ☐ 5
   - DISLIKE SLIGHTLY.......... ☐ 6
   - DISLIKE MODERATELY........ ☐ 7
   - DISLIKE VERY MUCH......... ☐ 8
   - DISLIKE EXTREMELY......... ☐ 9

FIG. 3A

OPEN-ENDED QUESTION

2. WHAT DID YOU LIKE ABOUT THIS PRODUCT?

THE SODA HAD A SWEET TASTE BUT WAS A LITTLE HIGH IN PRICE

FIG. 3B

HYBRID QUESTION

3. WHAT DID YOU EAT WITH IT?

- SALAD............. ☐ 1
   - BREAD............. ☐ 2
   - STARCH............ ☐ 3
   - ANY OTHER _____

FIG. 3C

WORD: THE SODA HAD A SWEET TASTE BUT WAS A LITTLE HIGH IN PRICE

CLASS: S S M S M K C S S M S M S K
         ─────────   ─────────
             1           2

1. ──HAD SWEET TASTE──→ TO THE TASTE NET
2. ──LITTLE HIGH PRICE──→ TO THE PRICE NET

FIG. 4

OPEN ENDED QUESTION ANALYSIS SYSTEM AND METHOD

BACKGROUND OF THE INVENTION

The present invention relates to a system and method for data processing responses to open-ended questions, and, more particularly, to a system and method for providing reproducible dynamically variable coding of open-ended respondent answers to open-ended questions.

Typically, Survey questionnaires, such as used by way of example in surveying consumer response to products, normally contain three basic types of questions, i.e., closed-ended questions, which are questions to which all possible choices are shown so that these responses can be pre-coded for data processing, such as shown in FIG. 3A by way of example; open-ended questions, which are fill in answers whose response is unknown in advance and therefore cannot normally be pre-coded for data processing, such as shown in FIG. 3B by way of example; and hybrid questions which contain both types of possible responses, such as shown in FIG. 3C by way of example. In the prior art, open-ended respondent answers have normally first been processed manually to establish a coding structure that is, unfortunately, not readily reproducible and primarily operator dependent, relying on the operator's interpretative ability to find the best match or match to some guide which normally has to first be developed by partial data sampling of arriving responses which may or may not reflect the type of coding structure needed for the balance of the responses. If the codes then have to be varied, then all of the previously coded responses must be gone back to and re-coded. This procedure is quite time consuming and does not optimize the advantages of employing data processing. In an effort to overcome this, there have been prior art attempts at simple FIND systems which merely display the responses for coding, but do not employ any type of computer aided decision in arriving at the coding. This is so despite the increasing use of artificial intelligence in general, such as in prior art language analysis systems, such as shown in U.S. Pat. Nos. 4,731,021; 4,635,199; 4,586,160; 4,703,425; and 4,594,686. Moreover, none of these prior art systems known to applicants is capable of providing open-ended question response analysis and processing to provide reproducible categorized dynamically variable coding of respondent answers. These disadvantages of the prior art are overcome by the present invention.

SUMMARY OF THE INVENTION

A method and system for data processing open-ended respondent answers to open-ended questions for providing reproducible categorized dynamically variable coding of the open-ended respondent answers to the open-ended questions. The data processor has an updateable retrievable word dictionary of words stored therein, with the open-ended answers comprising words. The open-ended answers are input to the data processor and classified into corresponding word types such as keywords, modifier words, skip words, connectors, and negative words, with the combined keywords and associated modifiers forming key phrases. The input words are converted into corresponding binary coded words for providing a binary defined sentence corresponding to the input open-ended respondent answer. The binary defined sentence is scanned and any keywords and associated modifiers are extracted to create a retrievable file comprising key phrases formed from the extracted keywords and associated modifiers, and the keywords per se. The key phrases are sorted in the created file and the occurrences of the sorted key phrases are counted and duplicates eliminated in order to provide a net key phrase file. The net key phrase file is displayed to the operator who then groups the displayed net key phrases into a coding structure which is stored and can be updated or modified under control of the operator.

BRIEF DESCRIPTION OF THE DRAWINGS

FIGS. 3A-3C are diagrammatic illustrations of three typical respondent answer types; i.e., closed-ended question, open-ended questions, and a hybrid question;

FIG. 4 is a diagrammatic illustration of a typical open-ended respondent answer and the method of the present invention as applied thereto;

DESCRIPTION OF THE PREFERRED EMBODIMENT

Figure 1:
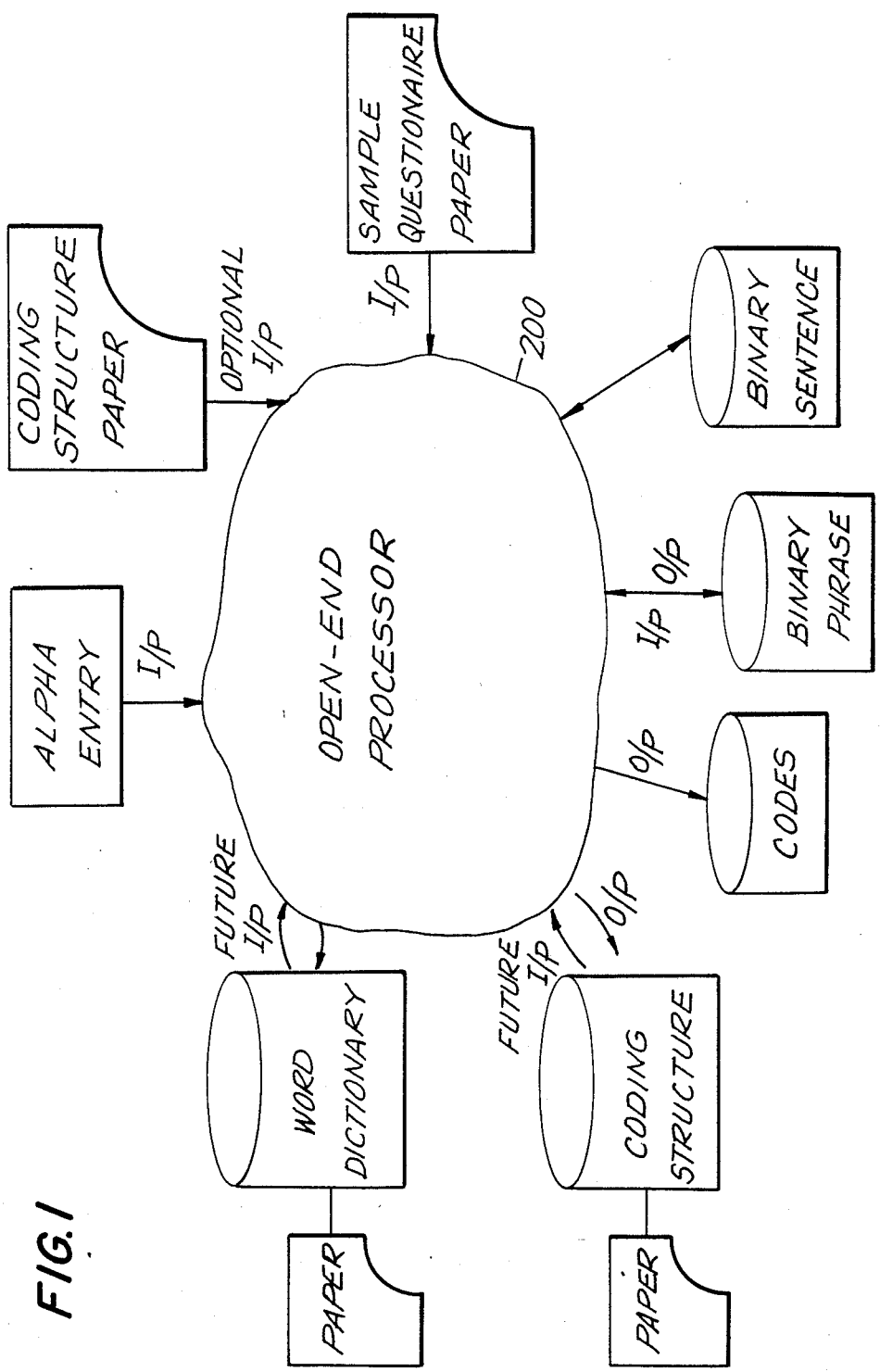
FIG. 1 is a diagrammatic illustration of an overall functional block diagram of the system of the present invention.

Referring now to the drawings in detail, and initially to FIGS. 1-4, the presently preferred method of the present invention shall now be described. As will be explained in greater detail hereinafter, the presently preferred system and method of the present invention employs a computer, such as a Hewlett-Packard P.C. or personal computer, which has been conventionally programmed, such as in the language C to carry out the presently preferred method of the present invention, to process respondent answers to questionnaires, such as preferably open-ended responses which are fill in type answers, such as shown in FIG. 3B or FIG. 3C, which are not known in advance and therefore, cannot normally be pre-coded. Of course as shown and preferred in FIG. 2, the system and method of the present invention may also be employed if desired, to merge data collected in response to closed-end questions, such as shown in FIG. 3A, which are questions having known pre-coded response choices, or hybrid questions, such a shown in FIG. 3C, which contain both possible responses in the available choices. Thus, market research data, or other types of data collected using the aforementioned question types, can be coded and processed to provide reproducible categorized dynamically variable coding in accordance with the present invention. The respondent answers are preferably input in the form of English words and converted to binary defined sentences for coding and analysis, with the codes identifying specific types of answers within a given category of answers.

Figure 5:
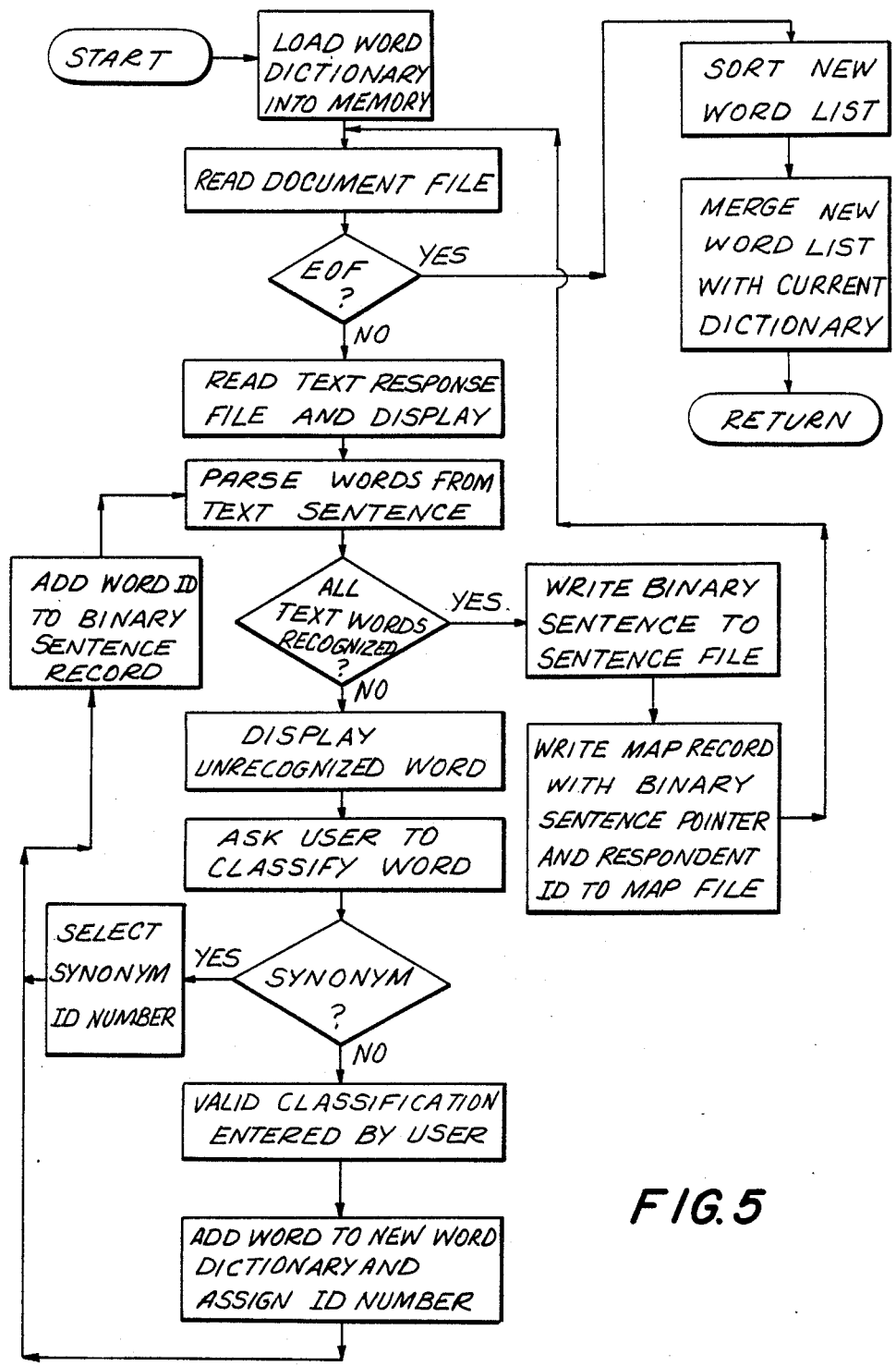
FIG. 5 is a logic flow diagram of the word recognition phase of the method of the present invention.
Figure 6:
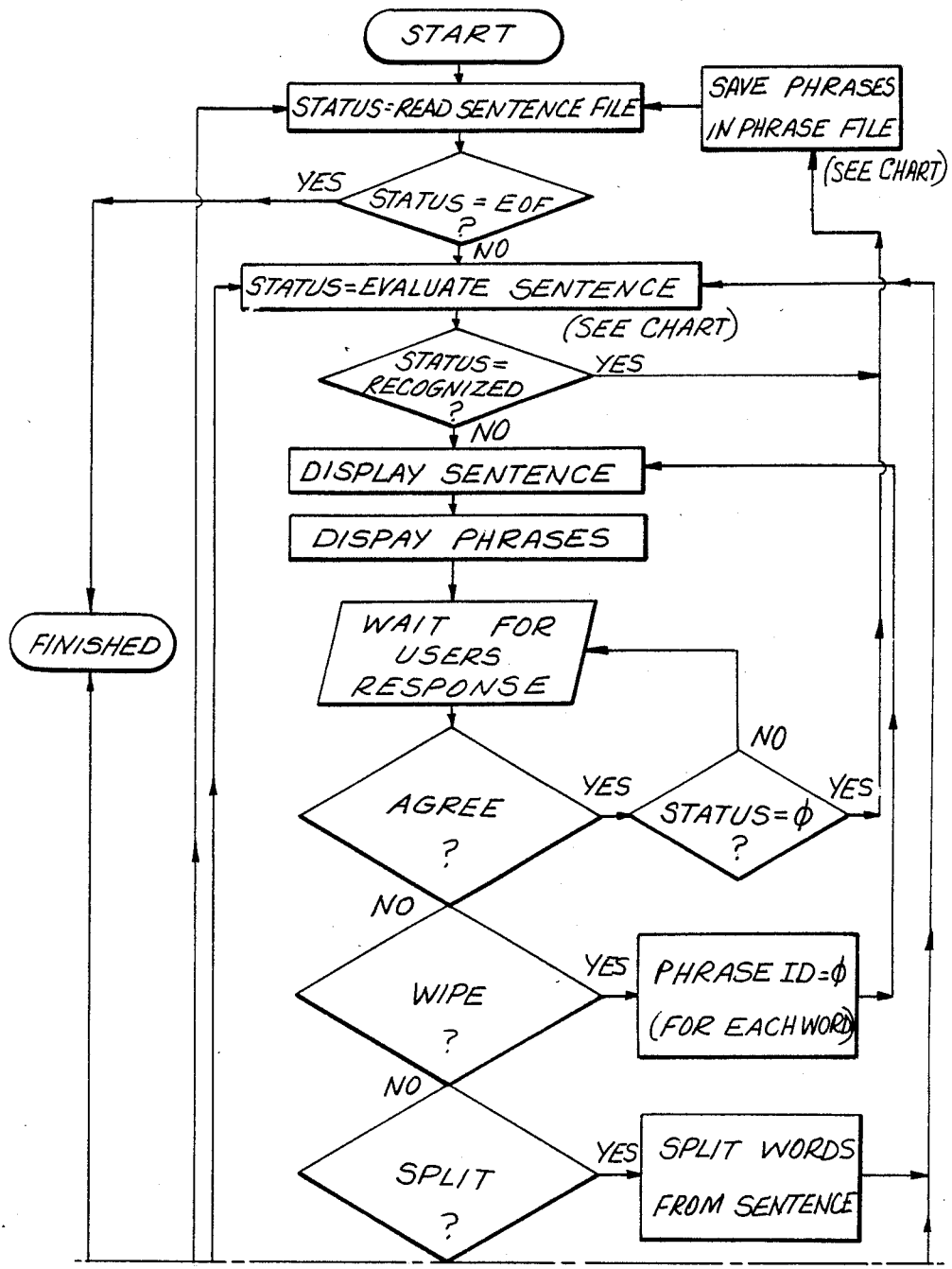
FIG. 6 is a logic flow diagram of the binary phrase extraction phase of the method of the present invention.
Figure 6:
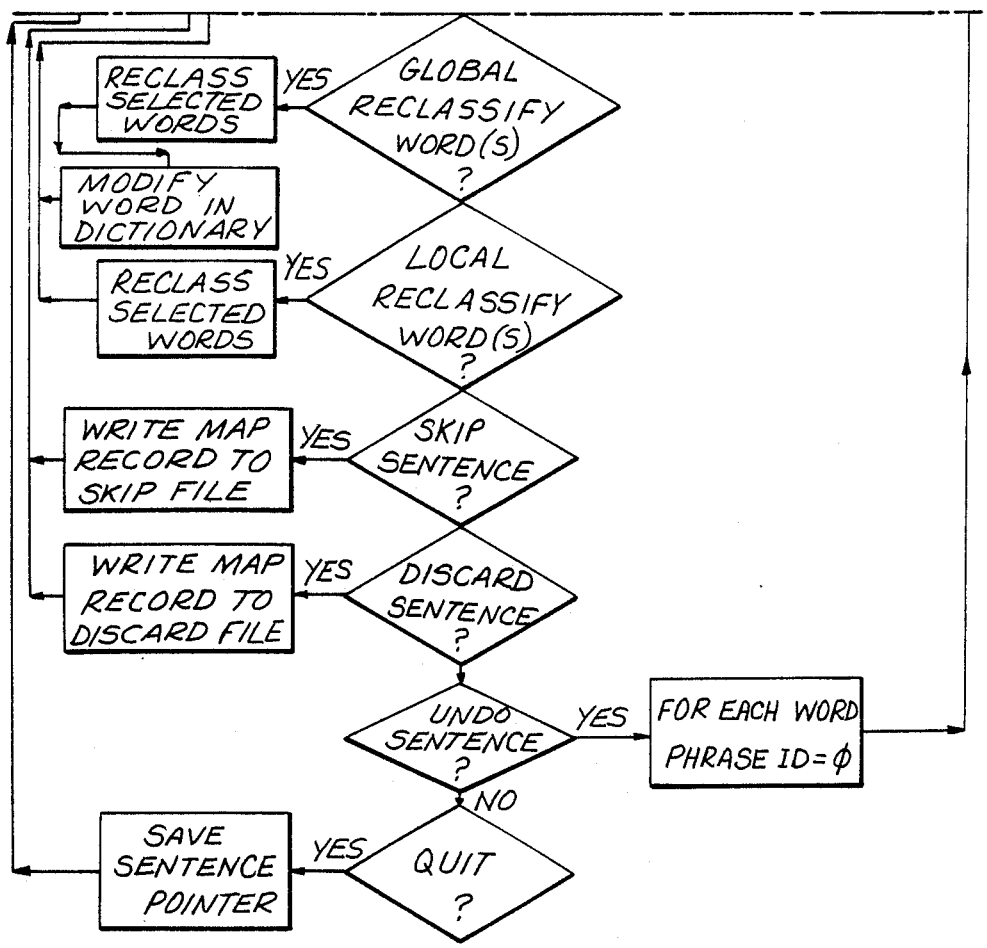
Figure 7:
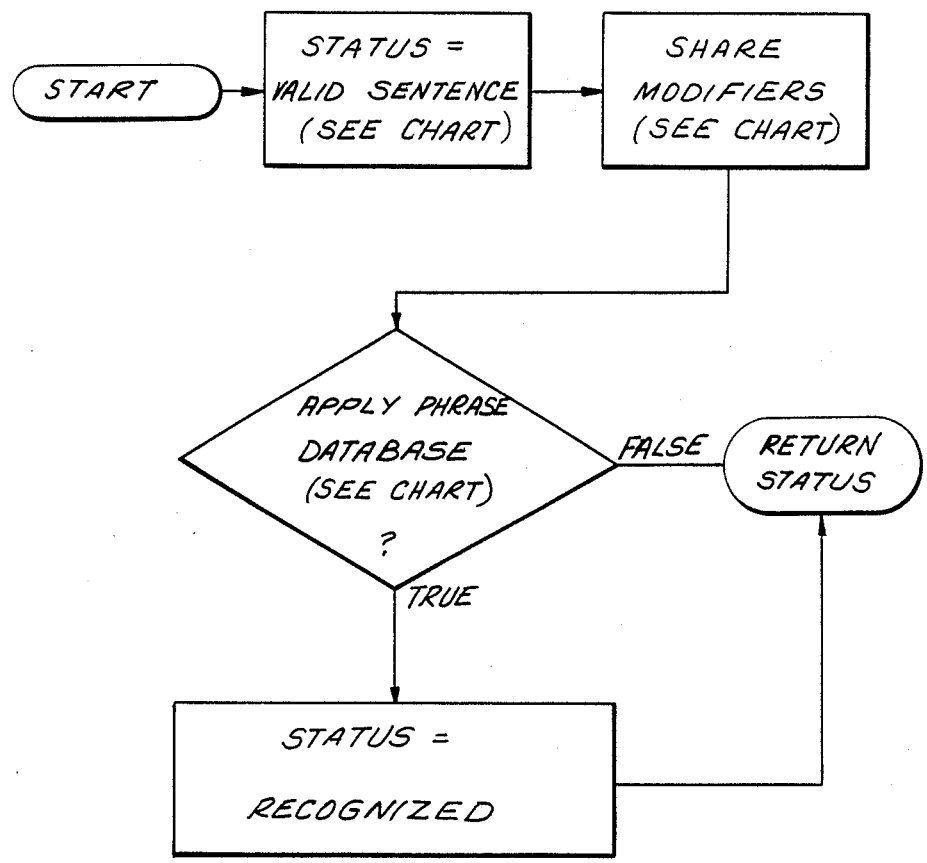
FIG. 7 is a logic flow diagram of the sentence evaluation phase of the method of the present invention.
Figure 8:
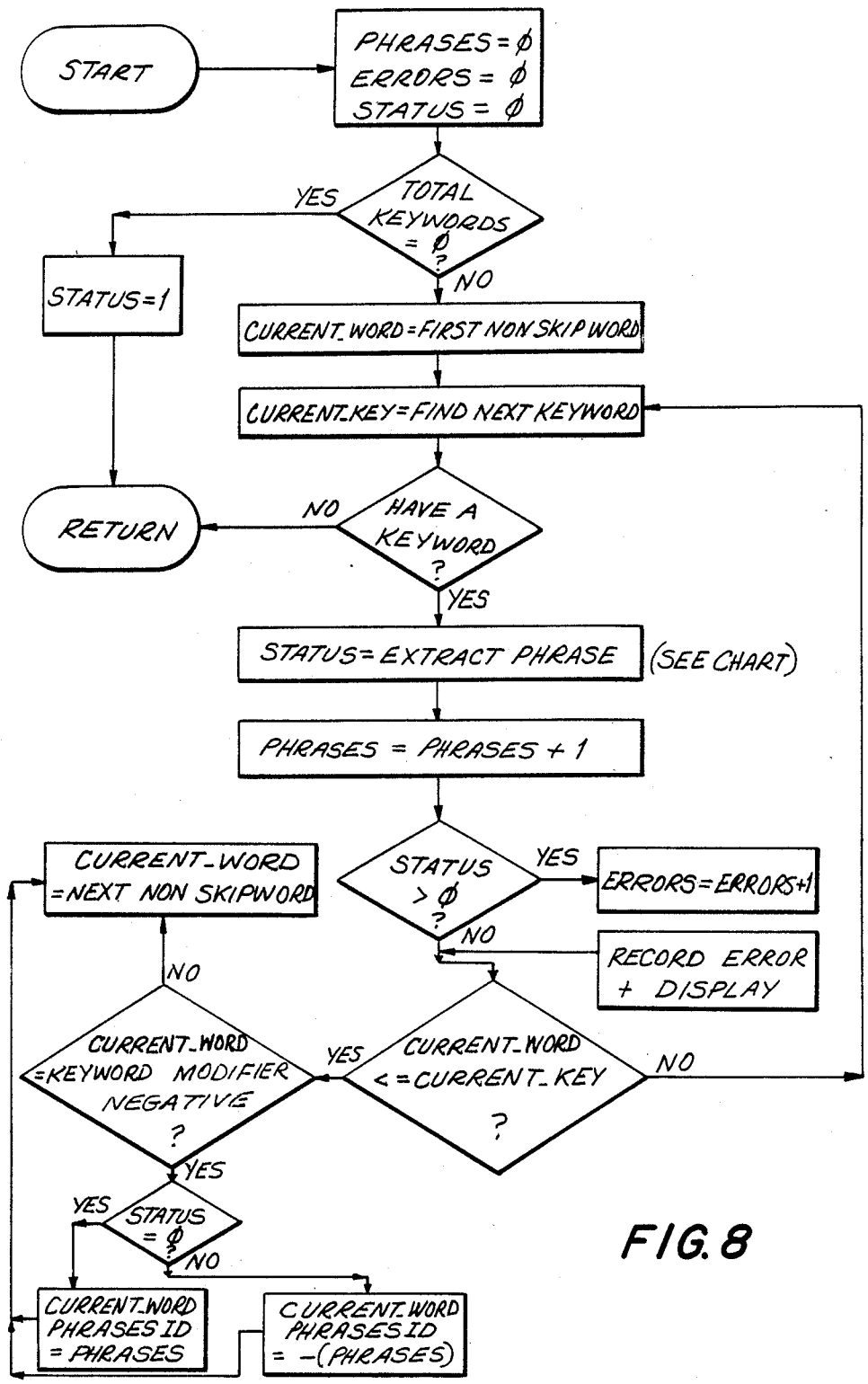
FIG. 8 is a logic flow diagram of the sentence validity phase of the method of the present invention.
Figure 9:
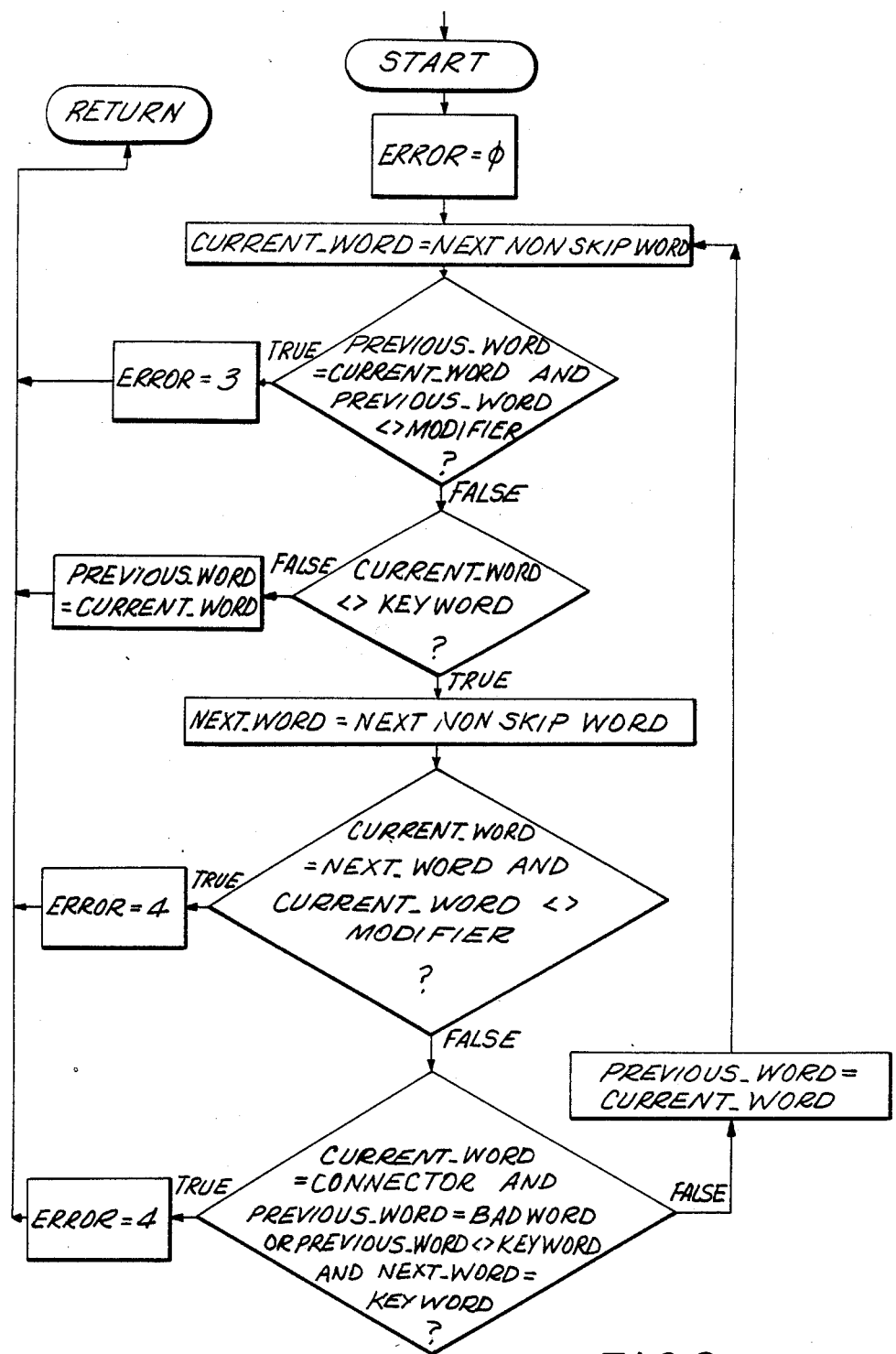
FIG. 9 is a logic flow diagram of the key phrase extraction phase of the method of the present invention.
Figure 10:
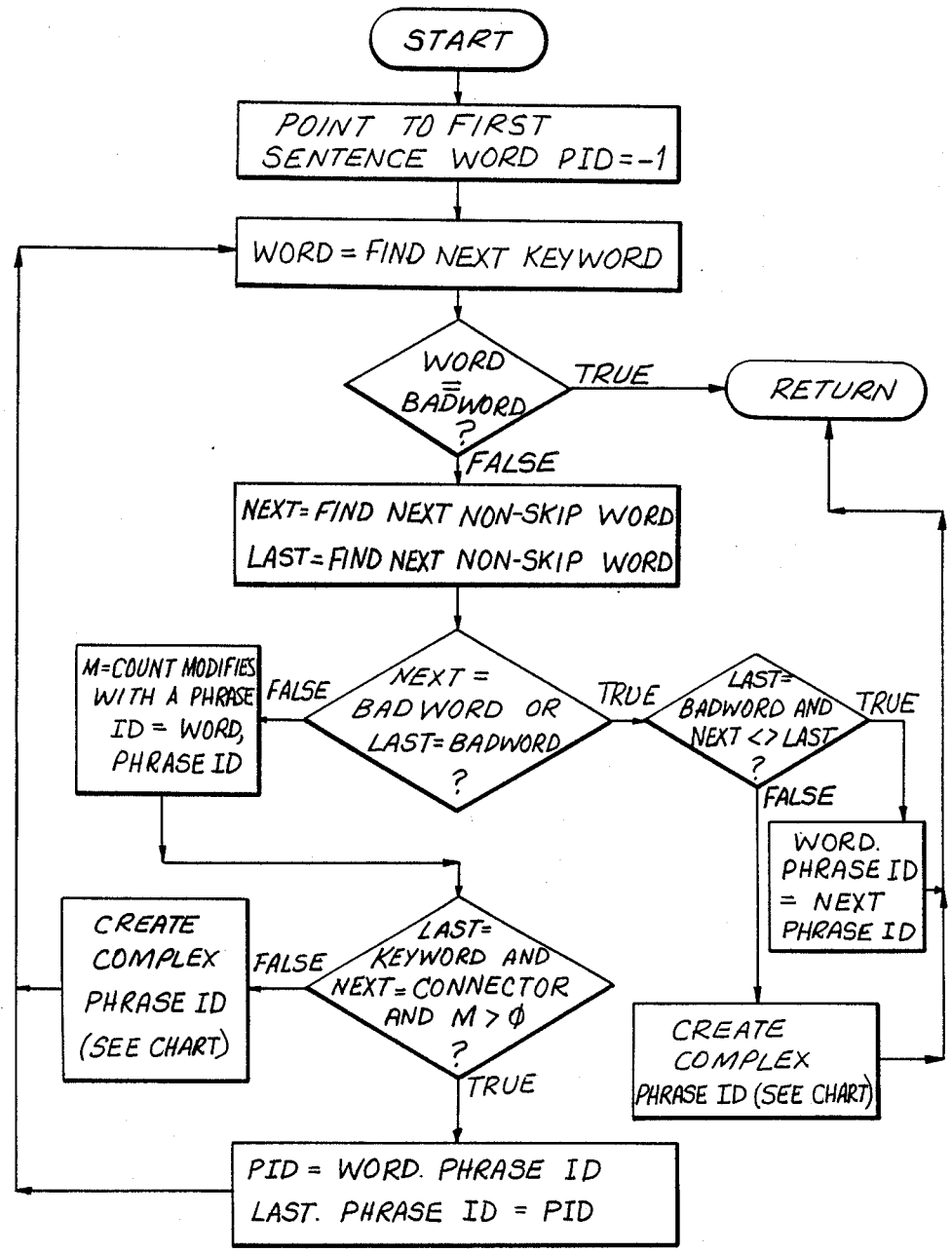
FIGS. 10-11 are logic flow diagrams of the share modifiers phase of the method of the present invention.
Figure 11:
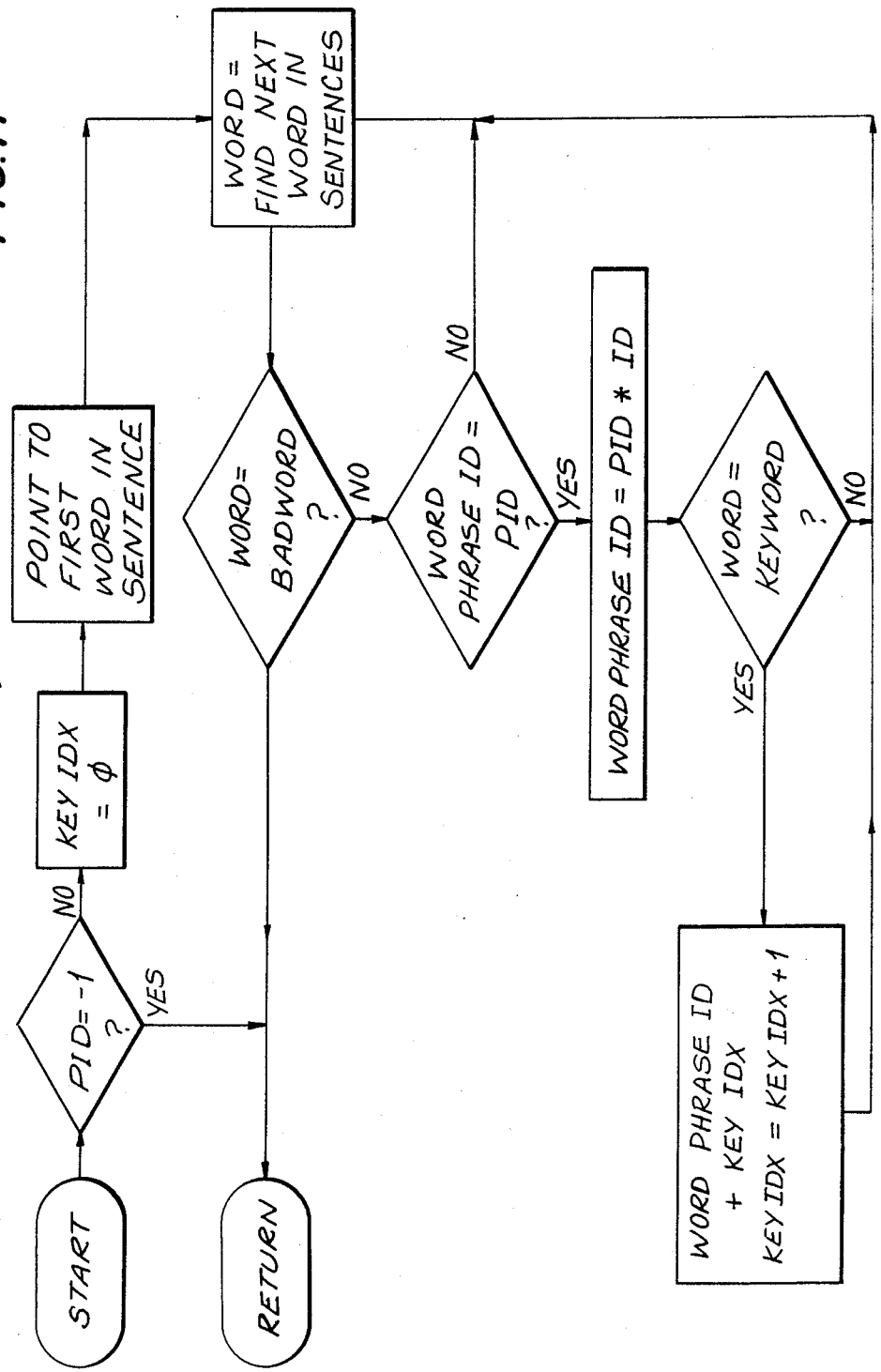
Figure 12:
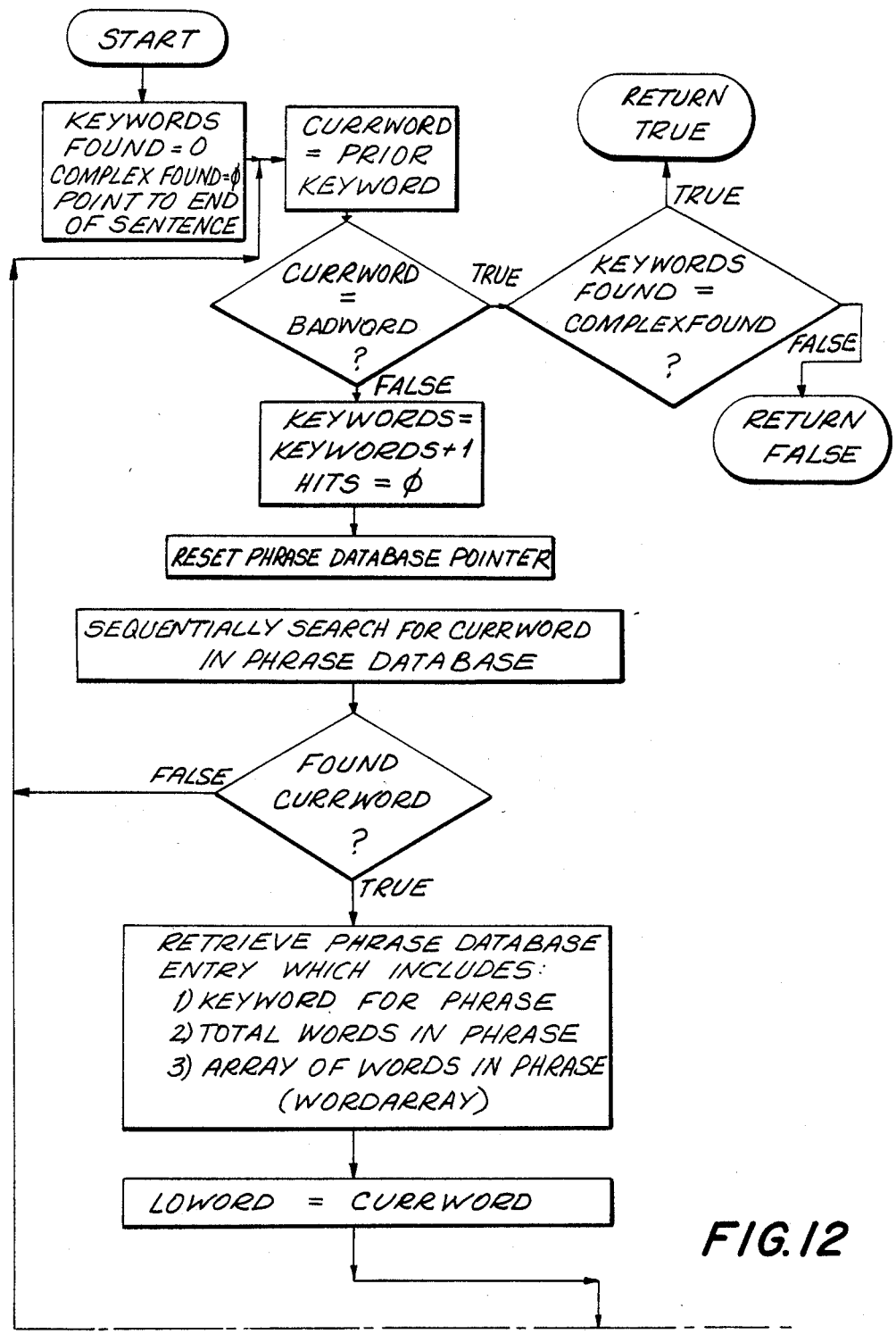
FIGS. 12-13 are a logic flow diagram of the apply database phase of the method of the present invention.
Figure 12:
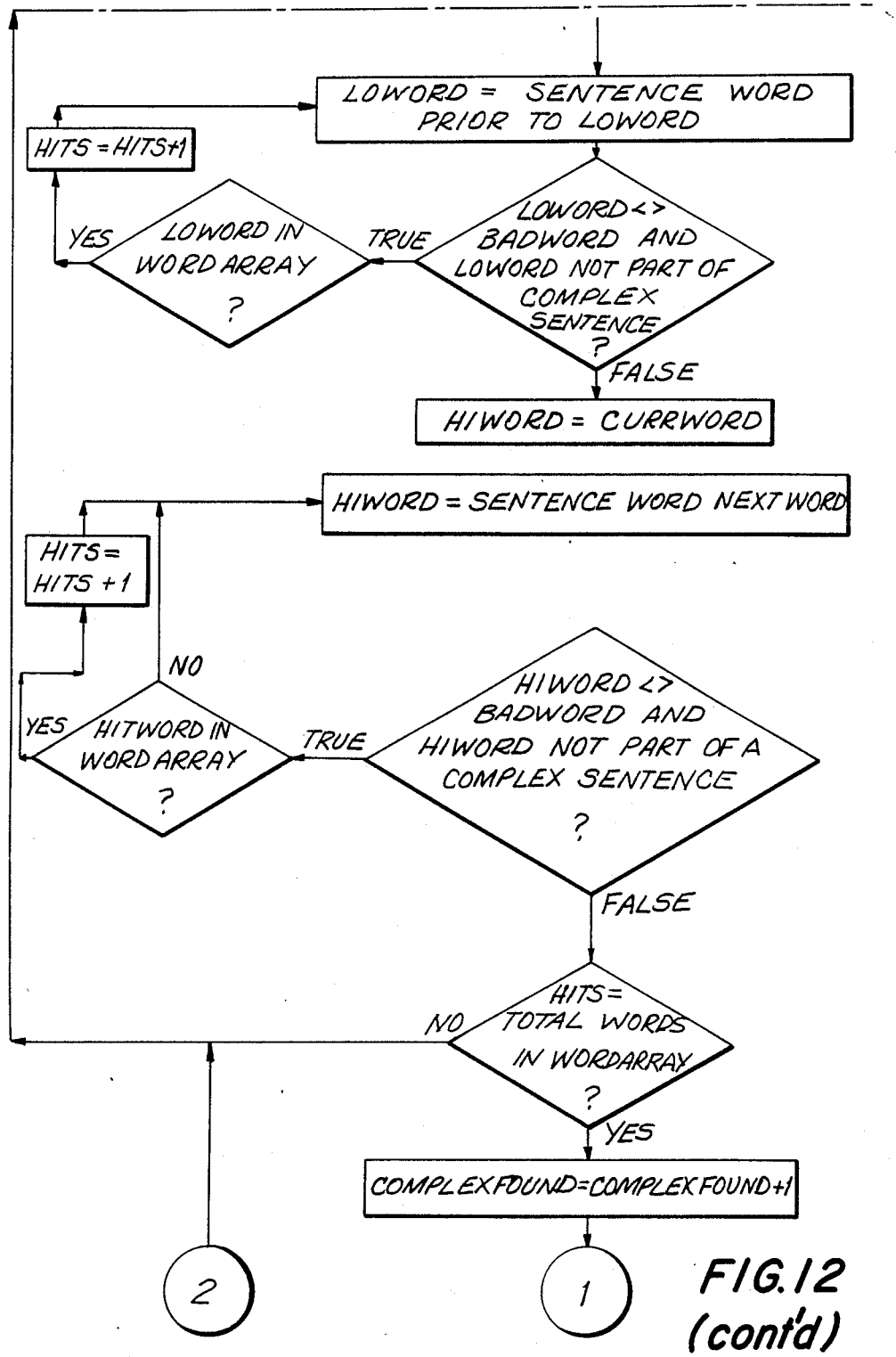
Figure 13:
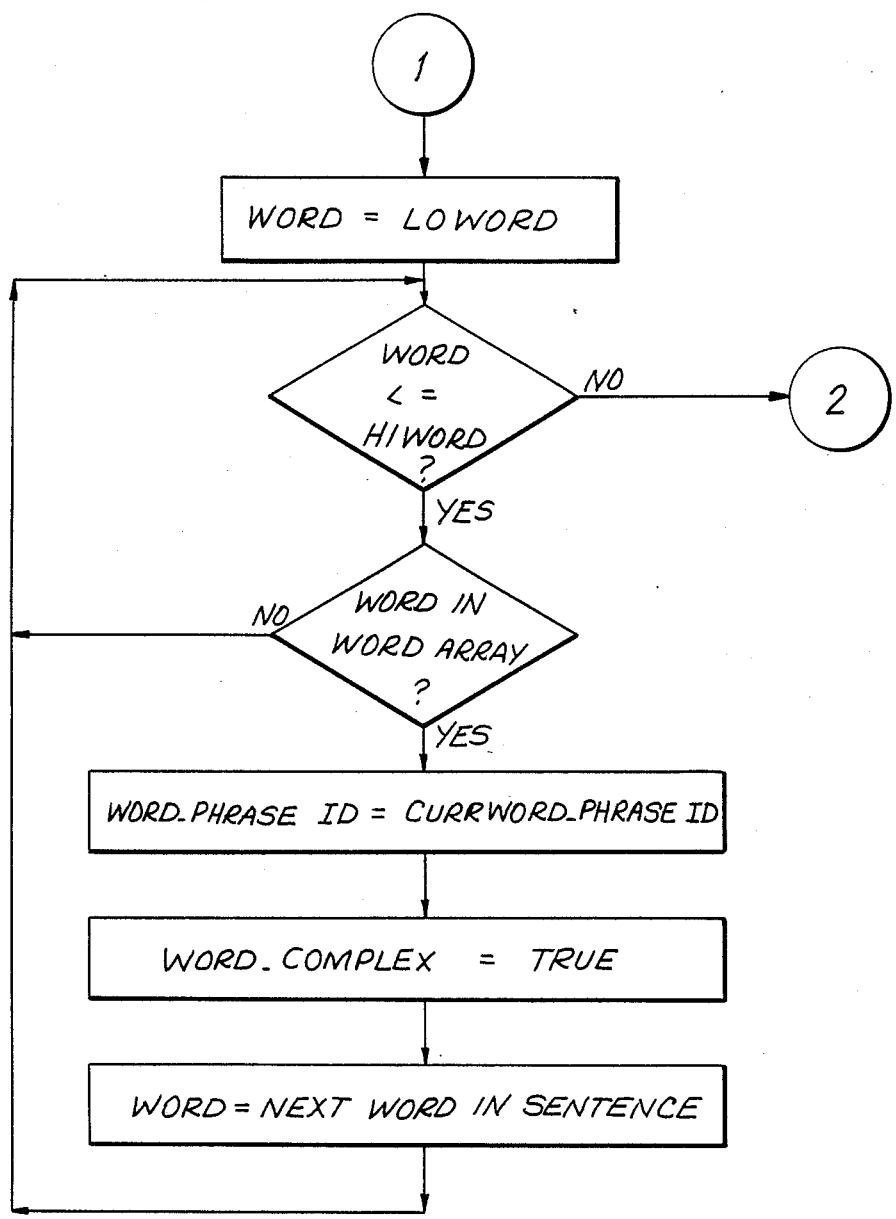
Figure 14:
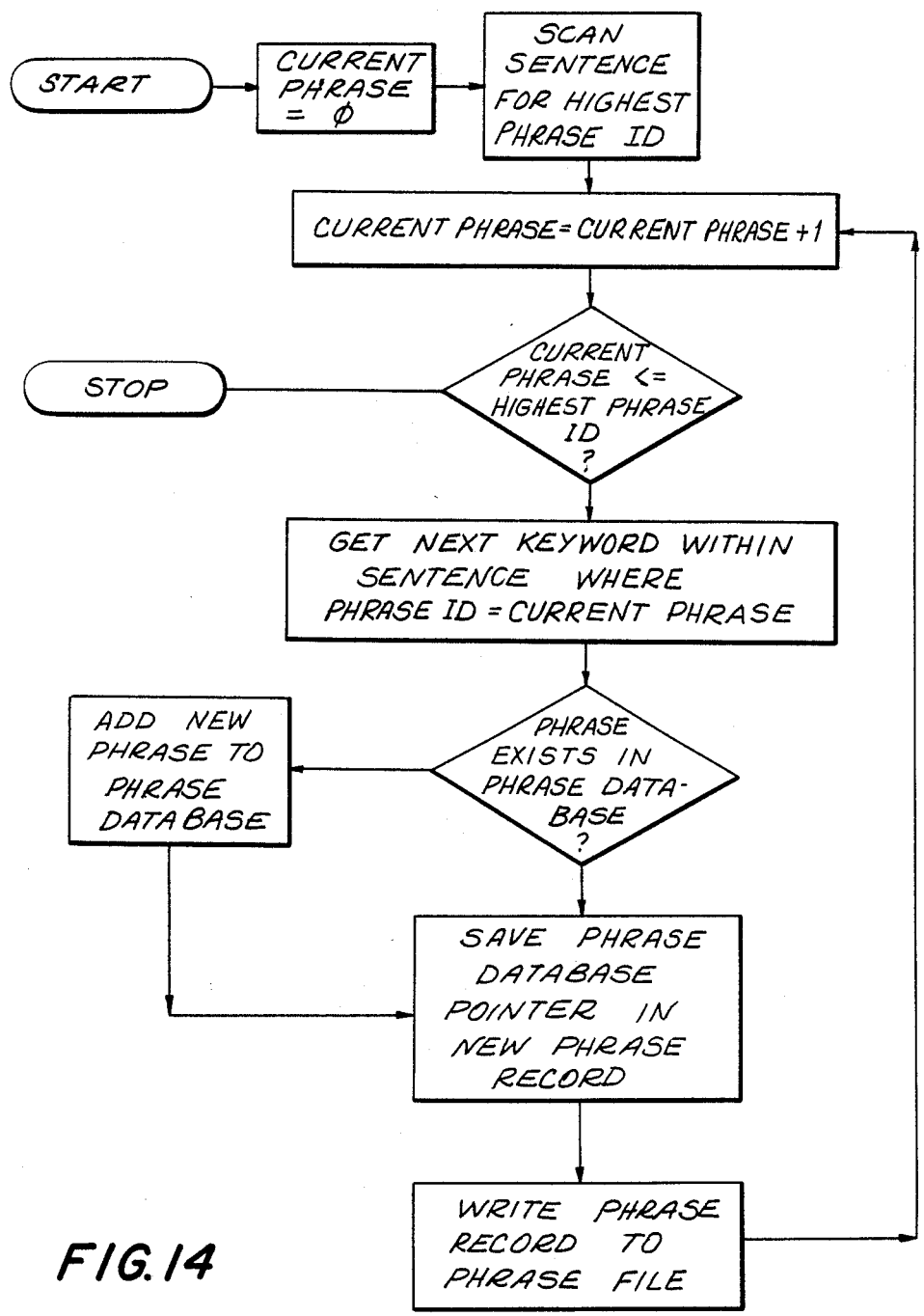
FIG. 14 is a logic flow diagram of the save phrases phase of the method of the present invention.

Preferably the respondent answers, such as the collected answers to open-ended questions, are input to the P.C. system 200. Along with the respondent answers, the respondent ID is also preferably entered so that preferably an index and reference is provided to the entry of any closed-end data also being entered for the respondent. The data is normally entered via a conventional keyboard associated with the P.C. which may be connected via a conventional modem, along with other P.C.'s to a central computer such as the HP 3000, for accumulative processing of the collected data if desired. The preferred system and method of the present invention uses word recognition, such as illustrated in FIG. 5, to classify the textual responses into keywords, which are keys to conveying a true meaning of the response and respondent answer; modifiers for these keywords, which are words attached to the keywords to form key phrases; skip words, which are words unimportant to conveying the meaning of the respondent answer and are thus, ignored; connector words, which are conjunctions which connect key phrases within the respondent answer so as to treat the answer as two separate responses separated by a connector; and negative words, which turn the key phrases into negative statements in the respondent answers, such as, by way of example, the word "dislike". There may also be unknown words which are words whose classification is unknown at the time of word recognition. Preferably the data processor 200 employs a stored dictionary of words having an associated ID number. The created dictionary is periodically updated as new words are added or input to the system so that recognition, preferably, only has to be done once. The open-ended textual data or respondent answers, which have been input to the system ar preferably converted into binary coded or defined sentences, which are numeric defined sentences, using the word ID numbers created for the dictionary, with synonyms or various forms of the word preferably using the same ID numbers. The binary defined sentences then, preferably, undergo phrase extraction, such as illustrated in FIG. 6, for each open-ended respondent answer using pre-defined rules to display each keyword phrase in the sentence, with each phrase including a keyword and possibly a modifier. Preferably, dynamic rule modification can be employed for phrases that do not comply with the pre-defined rules which are then learned by the computer or data processor and preferably adopted as a supplemental rule to follow whenever that phrase appears. The operator or user then uses the displayed keyword phrases to create net groups of keyword phrases which are coded. Preferably, these net groupings can be dynamically varied or modified at any time since all phrases are preferably stored in the data processor 200 in the created file and can readily be regrouped and automatically renumbered for every respondent ID.

Figure 2:
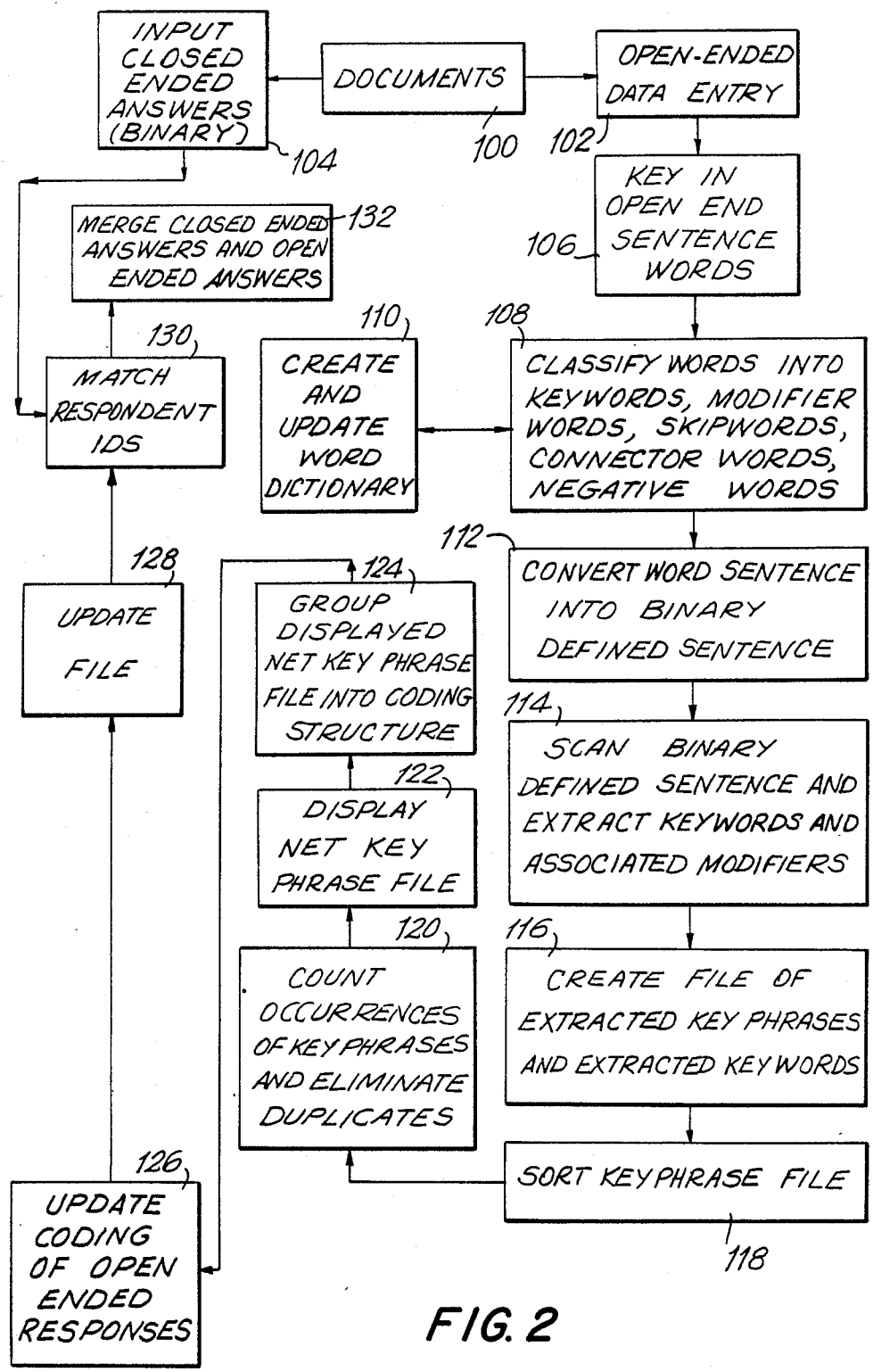
FIG. 2 is a functional logic flow diagram of the overall method of the present invention.

The above presently preferred method is illustrated generally in the flow diagram of FIG. 2, and in more detail, in the detailed flow diagram of FIGS. 5-14 which illustrate the various preferred phases of the method of the present invention from word recognition through saving the extracted and processed phrases. These flow diagrams are self-explanatory and need not be further described. With respect to FIG. 2, as shown and preferred, documents 100, such as questionnaires, are used to collect the data for open-ended data entry 102 as well as for any closed-ended data entry 104. In order to enter the open-ended responses, the sentence words are keyed in 106 and, as mentioned above, are classified 108, into keywords, modifiers, skip words, connector and negative words, and a word dictionary 110 is created and updated. The word sentence is then converted into a binary defined sentence 112. The binary defined sentence is preferably scanned and keywords and associated modifiers are extracted 114. A file is then created 116 of the extracted keywords and of extracted key phrases. This key phrase file 116 is then preferably sorted 118 and the number of occurrences of particular key phrases is counted and duplicates eliminated 120. As mentioned above, the net key phrase file is displayed 122 and the operator after observing this display, groups the displayed net key phrase file into a coding structure 124. The coding of the open-ended responses is then updated 126. The file is updated 128 and respondent IDs may be matched 130 and the coded open-ended responses merged 132, if desired, with the coded closed-end answers or, alternatively, may be kept in a separate file from the coded closed-end answers.

An example of a set of presently preferred rules to be used in practicing the preferred method of the present invention is as follows, using combinations of words which can be found in various typical sentences, such as the following three sentence as an example:

---

"I LIKE THE PRICE AND TASTE AND NOT THE FAT AND CALORIES"
"IT DID NOT TASTE GOOD"
"GOOD NOT TOO SWEET"

The following rules are preferably used to determine the
validity of a sentence, where K = KEYWORD, S = SKIP WORD,
M = MODIFIER, N = NEGATIVE, C = CONNECTOR and U = UNKNOWN. If
a sentence, such as the third sentence in the above example,
breaks a rule, it is preferrably considered invalid. Below, is
an example of the rules to both the valid and invalid sentences
in the above example.

| KEYWORD | - | PRICE | TASTE | FAT | CALORIES |
|---|---|---|---|---|---|
| SKIPWORD | - | I | IS | THE | |
| MODIFIER | - | LIKE | SWEET | LESS | |
| NEGATIVE | - | NOT | NO | | |
| CONNECTOR | - | AND | OR | | |

(/ indicate "Or" condition)
(1) Every sentence must preferably have at least one KEYWORD
valid rule 1:   K > 0           ... PRICE
break rule 1:   MM              ... GOOD LIKE -continued (2) SKIP and UNKNOWN words have no meaning to the sentence and are ignored.
valid rule 2:   I LIKE THE TASTE   "becomes"   LIKE TASTE
(3) 2 KEYWORDS may not exist next to each other. At least one MODIFIER or CONNECTOR must separate them.
valid rule 3:   KCK / KMK        . . . PRICE AND TASTE / PRICE GOOD TASTE
break rule 3:   KK / KSK         . . . PRICE TASTE / PRICE IS TASTE
(4) A KEY PHRASE is made of of 1 KEYWORD, O-n preceding MODIFIERS, and a preceding NEGATIVE.
valid rule 4:   NMK / NMMK / NK / K  . . . NOT GOOD TASTE
break rule 4:   NMM / SSS / SUS   . . . NOT GOOD SWEET
(5) A CONNECTOR must have a KEY PHRASE on to the Left and to the Right.
valid rule 5:   MKCNMK           . . . GOOD TASTE AND NOT GOOD PRICE
break rule 5:   CMK / KCKCM      . . . AND GOOD PRICE
(6) Any Trailing Modifiers are attached to the preceding KEYWORD.
rule 6:   MKCMKM   "goes to"  MK MMK  . . . GOOD TASTE AND
(7) All commas are replaced by the CONNECTOR "AND"
rules 6:   MMK, K    "goes to"  MMK & MMK
          LIKE LESS CALORIES, FAT
becomes   LIKE LESS CALORIES
          LIKE LESS FAT FIG. 4 illustrates another example of a typical sentence coded in accordance with the system of the present invention, with S referring to a skip word, N to a negative word, C to a connector, K to keywords and M to a modifier. Other examples of typical analyses of sentences in accordance with the present invention are given below in Tables A-G which represent seven net groupings including taste/flavor/crispness, calories/fat/weight, price/costs, all other responses appearance/color, availability net, and health responses, respectively.

TABLE A

| NET #: 1 TASTE/FLAVOR/CRISPNESS CODE: 0 TOTAL [5] | | | |
|---|---|---|---|
| Pos | Freq | Base | Alpha |
| (1) | [ 3] | (n) | → CRISP |
|  | [ 1] | (n) | → CRISPIER |
|  | [ 3] | (n) | → CRISPY |
|  | [ 2] | (n) | MED → CRISPY |
|  | <<9>> |  | total |
| (2) | [ 2] | (n) | → FLAVOR |
|  | [12] | (n) | → TASTE |
|  | [34] | (n) | → TASTE |
|  | [14] | (n) | GOOD → TASTE |
|  | [ 2] | (n) | MORE WELL WORTH LONG GOOD → TASTE |
|  | [ 1] | (n) | GREATER → TASTE |
|  | [ 1] | (n) | WILL GREAT → TASTE |
|  | [ 1] | (n) | 33 FEWER → TASTE |
|  | [ 1] | (n) | HAVE GREAT → TASTE |
|  | [ 1] | (n) | WELL GOOD → TASTE |
|  | [ 1] | (n) | GOOD IF GREAT RESTAURANT → TASTE |
|  | [24] | (n) | GREAT → TASTING |
|  | [ 2] | (n) | BETTER → TASTING |
|  | [ 1] | (n) | GOOD → TASTING |
|  | [ 1] | (n) | PROMISE GREAT → TASTING |
|  | [ 1] | (n) | WILL GREAT → TASTING |
|  | [ 2] | (n) | → TASTY |
|  | <<101>> |  | total |
| (3) | [ 1] | (n) | NEW → TASTE |
|  | [ 1] | (n) | CONCERN → TASTE |
|  | [ 1] | (n) | LIGHTER → TASTE |
|  | [ 1] | (n) | WOULDN'T LIKE ANYTHING LIKE OLD → TASTE |
|  | <<4>> |  | total |
| (4) | [ 1] | (n) | CAN JUDGE → FLAVOR |
|  | [ 1] | (n) | IF HAVE GOOD → FLAVOR |
|  | [ 1] | (n) | WILL → TASTE |
|  | [ 1] | (n) | LIKE FIRST GIVING ANSWER → TASTE |
|  | [ 1] | (n) | UNTIL → TASTED |
|  | <<5>> |  | total |
| (5) | [ 1] | (n) | SAME → TASTE |
|  | [ 1] | (n) | SAME GOOD → TASTE |
|  | [ 1] | (n) | WOULDN'T POTATO IMPORTANT CHANGE → TASTE |
|  | [ 1] | (n) | IF SAME → TASTED |
|  | [ 1] | (n) | YOU CAN CHOOSE BETTER → TASTING |
|  | <<5>> |  | total |

TABLE B

| | | | NET #: 2 CALORIES/FAT/WEIGHT CODE: 1 TOTAL [6] |
|---|---|---|---|
| Pos | Freq | Base | Alpha |
| (1) | [ 2] | (n) | SMALLER CONTENT → CALORIE |
| | [ 1] | (n) | CONTENT → CALORIE |
| | [ 1] | (n) | LOWER → CALORIE |
| | [ 1] | (n) | INTAKE → CALORIE |
| | [ 5] | (n) | → CALORIES |
| | [87] | (n) | LESS → CALORIES |
| | [ 9] | (n) | LOWER → CALORIES |
| | [ 3] | (n) | FEW → CALORIES |
| | [ 2] | (n) | DECREASE → CALORIES |
| | [ 5] | (n) | LOW → CALORIES |
| | [87] | (n) | FEWER → CALORIES |
| | [ 3] | (n) | CUT → CALORIES |
| | [38] | (n) | 33 FEWER → CALORIES |
| | [ 3] | (n) | HAVE LESS → CALORIES |
| | [ 1] | (n) | REDUCED → CALORIES |
| | [ 1] | (n) | REDUCING → CALORIES |
| | [ 5] | (n) | 33 LESS → CALORIES |
| | [ 1] | (n) | LIKE LESS → CALORIES |
| | [ 1] | (n) | HAVE FEWER → CALORIES |
| | [ 1] | (n) | FEWER ADDED → CALORIES |
| | [ 1] | (n) | GOOD CONCERN → CALORIES |
| | [ 1] | (n) | FEWER GREAT → CALORIES |
| | [ 1] | (n) | FEWER NICE → CALORIES |
| | [ 1] | (n) | DEFINITELY WELL FEWER → CALORIES |
| | [ 1] | (n) | 33 LESS FEWER → CALORIES |
| | [ 2] | (n) | PROBABLY LIKE LESS → CALORIES |
| | [ 1] | (n) | HELP MAKE BETTER YOU → CALORIES |
| | [ 1] | (n) | LIKE 33 LESS LESS → CALORIES |
| | <<266>> | | total |
| (2) | [ 2] | (n) | DONT BOTHER → CALORIES |
| | [ 2] | (n) | NOT CONCERNED → CALORIES |
| | <<4>> | | total |
| (3) | [ 2] | (n) | BETTER → DIET |
| | [ 1] | (n) | GREAT → DIET |
| | [ 1] | (n) | GAINING LESS → EATING |
| | <<4>> | (n) | total |
| (4) | [ 4] | (n) | → FAT |
| | [183] | (n) | LESS → FAT |
| | [ 2] | (n) | SS → FAT |
| | [ 2] | (n) | DECREASE → FAT |
| | [ 2] | (n) | NOT CONCERNED → FAT |
| | [ 3] | (n) | CUT → FAT |
| | [41] | (n) | 75 LESS → FAT |
| | [ 3] | (n) | LOWER → FAT |
| | [ 1] | (n) | WOULDN'T HAVE → FAT |
| | [ 4] | (n) | LOW → FAT |
| | [ 1] | (n) | REDUCE → FAT |
| | [ 1] | (n) | LESSER → FAT |
| | [ 1] | (n) | REDUCED → FAT |
| | [ 1] | (n) | FAST FOOD → FAT |
| | [ 1] | (n) | IMPROVE INTAKE → FAT |
| | [ 1] | (n) | LESS MORE → FAT |
| | [ 4] | (n) | LESS BETTER → FAT |
| | [ 5] | (n) | HAVE LESS → FAT |
| | [ 1] | (n) | LESS IMPORTANT → FAT |
| | [ 3] | (n) | LIKE LESS → FAT |
| | [ 2] | (n) | LOWER CONTENT → FAT |
| | [ 1] | (n) | LIKE REDUCED → FAT |
| | [ 1] | (n) | HIGH CONTENT → FAT |
| | [ 1] | (n) | DEFINITELY LESS → FAT |
| | [ 1] | (n) | LESS SATURATED → FAT |
| | [14] | (n) | 50 LESS → FAT |
| | [ 1] | (n) | REGULAR LESS → FAT |
| | [ 1] | (n) | LESS GOOD → FAT |
| | [27] | (n) | 33 LESS → FAT |
| | [ 1] | (n) | BETTER YOU LESS → FAT |
| | [ 2] | (n) | LESS CONSIDER IMPORTANT → FAT |
| | [ 2] | (n) | HAVE 33 LESS → FAT |
| | [ 1] | (n) | NOT KNOWING LESS MORE → FAT |
| | [ 1] | (n) | LESS SAME REGULAR → FAT |
| | [ 1] | (n) | LESS LESS BAD → FAT |
| | [ 1] | (n) | HAVE 75 LESS → FAT |
| | [ 1] | (n) | HAVE 50 LESS → FAT |
| | [ 1] | (n) | AREN'T BAD YOU MORE → FAT |
| | [ 1] | (n) | 50 LESS IMPORTANT → FAT |
| | [ 1] | (n) | FRIED 33 LESS → FAT |
| | [ 1] | (n) | HELP LOWER CONTENT GOOD → FAT |
| | [ 1] | (n) | 33 LESS LITTLE BETTER → FAT |
| | [ 1] | (n) | LIKE SEE MORE LOW PRODUCTS FAST FOOD → FAT |
| | [ 1] | (n) | LESS → FATENSIVE |

TABLE B-continued

NET #: 2 CALORIES/FAT/WEIGHT CODE: 1 TOTAL [6]

| Pos | Freq | Base | Alpha |
|---|---|---|---|
|     | [ 1]   | (n) | LESS → FATS |
|     | [ 1]   | (n) | SATURATED → FATS |
|     | [ 2]   | (n) | NOT → FATTENING |
|     | [ 7]   | (n) | LESS → FATTENING |
|     | [ 1]   | (n) | WILL LESS → FATTENING |
|     | [ 1]   | (n) | NOT MATTER IF LESS → FATTENING |
|     | <<343>> |    | total |
| (5) | [ 3]   | (n) | LOW → SALT |
|     | <<3>>  |    | total |
| (6) | [ 2]   | (n) | WOULDN'T GAIN → WEIGHT |
|     | [ 1]   | (n) | → WEIGHT |
|     | [ 1]   | (n) | LESS GAIN → WEIGHT |
|     | [ 1]   | (n) | GAINING LESS → WEIGHT |
|     | <<5>>  |    | total |

TABLE C

NET #: 3 PRICE/COSTS CODE: 2 TOTAL: [4]

| Pos | Freq | Base | Alpha |
|---|---|---|---|
| (1) | [ 1]   | (n) | NOT OVERLY → EXPENSIVE |
|     | [ 1]   | (n) | NOT ALOT MORE → MONEY |
|     | [ 8]   | (n) | → PRICE |
|     | [ 2]   | (n) | NO PROBLEM → PRICE |
|     | [ 3]   | (n) | GOOD → PRICE |
|     | [ 2]   | (n) | REASONABLE → PRICE |
|     | [ 1]   | (n) | NOT MORE → PRICE |
|     | [ 1]   | (n) | SMALL INCREASE → PRICE |
|     | [ 1]   | (n) | → VALUE |
|     | <<20>> |    | total |
| (2) | [ 4]   | (n) | → COST |
|     | <<4>>  |    | total |
| (3) | [ 2]   | (n) | 5 → CENTS |
|     | [11]   | (n) | 5 MORE → CENTS |
|     | [ 1]   | ( ) | 10 MORE → CENTS |
|     | [ 1]   | (n) | 5 MORE WORTH → CENTS |
|     | [ 1]   | (n) | BETTER 5 MORE WELL WORTH → CENTS |
|     | [ 1]   | (n) | LESS → COST |
|     | [ 1]   | (n) | YOU → COST |
|     | [ 1]   | (n) | NOT MORE WISE → COST |
|     | [ 1]   | (n) | DONT TOO MORE → COST |
|     | [ 1]   | (n) | DON'T ALOT MORE → COST |
|     | <<21>> |    | total |
| (4) | [ 1]   | (n) | NOT RATHER → PAY |
|     | [ 1]   | (n) | WOULDNT GREAT MORE → PAY |
|     | <<2>>  |    | total |

TABLE D

NET #: 4 ALL OTHER RESPONSES CODE: 3 TOTAL: [8]

| Pos | Freq | Base | Alpha |
|---|---|---|---|
| (1) | [14]   | (n) | → NOTHING |
|     | <<14>> | (n) | total |
| (2) | [ 2]   | (n) | SERVE REGULAR → FRIES |
|     | [ 2]   | (n) | GOOD REGULAR → FRIES |
|     | [ 2]   | ( ) | → FRIES |
|     | [ 3]   | (n) | OLD → FRIES |
|     | [ 3]   | (n) | REGULAR → FIRES |
|     | [ 1]   | (n) | LARGER → FRIES |
|     | [ 3]   | (n) | CURRENT → FRIES |
|     | [ 1]   | (n) | LIKE → FRIES |
|     | [ 1]   | (n) | ADDITION REGULAR → FRIES |
|     | [ 1]   | (n) | GOOD ORIGINAL → FRIES |
|     | [ 1]   | (n) | ALONG CURRENT → FRIES |
|     | [ 1]   | (n) | ALTERNATE REGULAR OFFERED → FRIES |
|     | [ 1]   | (n) | REGULAR MORE CALORIED → FRIES |
|     | [ 1]   | (n) | LIKE POTATO WEDGES STEAK → FRIES |
|     | [ 1]   | (n) | OLD FASHIONED PEELS LEFT → FRIES |
|     | [ 1]   | (n) | NOT → REPLACING |
|     | [ 1]   | (n) | NOT ADDING → REPLACING |
|     | <<26>> |    | total |
| (3) | [ 1]   | (n) | WHAT MORE YOU → ASK |
|     | [ 1]   | (n) | WILL → BUY |
|     | [ 1]   | (n) | GREAT WILL → BUY |
|     | <<3>>  |    | total |
| (4) | [ 3]   | (n) | → CHOICE |
|     | [ 2]   | (n) | EITHER → CHOICE |

TABLE D-continued

| | | | NET #: 4 ALL OTHER RESPONSES CODE: 3 TOTAL: [8] | |
|---|---|---|---|---|
| Pos | Freq | Base | Alpha | |
| | [ 1] | (n) | YOU WILL → CHOICE | |
| | [ 1] | (n) | NEW REGULAR → CHOICE | |
| | <<7>> | | total | |
| (5) | [ 1] | (n) | WONT → KNOW | |
| | [ 1] | (n) | DONT → KNOW | |
| | [ 2] | (n) | → NONE | |
| | [ 1] | (n) | NO HAVE → OPINION | |
| | <<5>> | | total | |
| (6) | [ 1] | (n) | MORE CONTAINER → FRIES | |
| | [ 1] | (n) | SAME AMOUNT → FRIES | |
| | [ 1] | (n) | LARGER → PORTIONS | |
| | [ 1] | (n) | MORE → QUANTITY | |
| | [ 1] | (n) | → SIZE | |
| | <<5>> | | total | |
| (7) | [ 1] | (n) | CERTAINLY → 1 | |
| | [ 2] | (n) | → EVERYTHING | |
| | [ 1] | (n) | GREAT → IDEA | |
| | [ 1] | (n) | GOOD → SOUND | |
| | [ 1] | (n) | LIKE → TRY | |
| | <<6>> | | total | |
| (8) | [ 1] | (n) | LESS MESSY → EAT | |
| | [ 1] | (n) | NOT → LIMP | |
| | [ 2] | (n) | NOT → MUSHY | |
| | [ 1] | (n) | OUTSIDE MIDDLE → SOFT | |
| | <<5>> | | total | |

TABLE E

| | | | NET #: 4 APPEARANCE/COLOR CODE: 4 TOTAL: [3] |
|---|---|---|---|
| Pos | Freq | Base | Alpha |
| (1) | [ 2] | (n) | NOT HARD GOLDEN → COLOR |
| | <<2>> | | total |
| (2) | [ 2] | (n) | → BROWNER |
| (3) | [ 2] | (n) | FULL → SIZE |
| | <<2>> | | total |

TABLE F

| | | | NET #: 6 AVAILABILITY NET CODE: 5 TOTAL: [1] |
|---|---|---|---|
| Pos | Freq | Base | Alpha |
| (1) | [ 4] | (n) | → AVAILABLE |
| | [ 1] | (n) | EASILY → AVAILABLE |
| | [ 1] | (n) | WILL → AVAILABLE |
| | [ 1] | (n) | FAST FOOD → AVAILABLE |
| | [ 1] | (n) | FAVORITE RESTAURANT → AVAILABLE |
| | [ 1] | (n) | ADDITION REGULAR → AVAILABLE |
| | [ 1] | (n) | FAST FOOD OUTLET → AVAILABLE |
| | [ 1] | (n) | CAN ANYWHERE → BUY |
| | [ 1] | (n) | → CARRIER |
| | [ 1] | (n) | FAVORITE → RESTUARANT |
| | <<13>> | | total |

TABLE G

| | | | NET #: 7 HEALTH RESPONSES CODE: 6 TOTAL: [6] |
|---|---|---|---|
| Pos | Freq | Base | Alpha |
| (1) | [ 2] | (n) | → CHOLESTEROL |
| | [ 8] | (n) | LESS → CHOLESTEROL |
| | [ 1] | (n) | LOWER → CHOLESTEROL |
| | [ 1] | (n) | BETTER → CHOLESTEROL |
| | [ 1] | (n) | PROBABLY LESS → CHOLESTEROL |
| | [ 1] | (n) | LESS BETTER → CHOLESTEROL |
| | [ 1] | (n) | LOT LESS → CHOLESTEROL |
| | [ 1] | (n) | LESS GOOD → CHOLESTEROL |
| | [ 1] | (n) | LESS DANGER → CHOLESTEROL |
| | [ 1] | (n) | USUALLY LOWER → CHOLESTEROL |
| | [ 1] | (n) | HAVE LESS → CHOLESTEROL |
| | [ 1] | (n) | GOOD CONCERN → CHOLESTEROL |
| | [ 1] | (n) | POSSIBLY LESS → CHOLESTEROL |
| | <<21>> | | total |
| (2) | [ 1] | (n) | NOT CLOG FAST → ARTERIES |
| | [ 1] | (n) | DOCTORS SANCTION → EAT |
| | [ 2] | (n) | HELP → FITNESS |
| | <<4>> | | total |
| (3) | [ 2] | (n) | → HEALTH |
| | [ 1] | (n) | CONSCIOUS → HEALTH |

TABLE G-continued

NET #: 7 HEALTH RESPONSES CODE: 6 TOTAL: [6]

| Pos | Freq | Base | Alpha |
|---|---|---|---|
|  | [ 4] | (n) | BETTER → HEALTH |
|  | [ 1] | (n) | MORE BENEFICIAL → HEALTH |
|  | [ 1] | (n) | BETTER CONCERNED → HEALTH |
|  | [ 1] | (n) | MORE → HEALTHFUL |
|  | [ 1] | (n) | WILL MORE → HEALTHFUL |
|  | [ 3] | (n) | → HEALTHIER |
|  | <<14>> |  | total |
| (4) | [ 1] | (n) | BETTER YOU → NUTRIONALLY |
|  | [ 1] | (n) | IMPROVED → NUTRITION |
|  | [ 1] | (n) | MORE → NUTRITIOUS |
|  | <<3>> |  | total |
| (5) | [ 1] | (n) | NOT → SALT |
|  | [ 3] | (n) | LESS → SALT |
|  | [ 1] | (n) | HOW → SALT |
|  | <<5>> |  | total |
| (6) | [ 6] | (n) | LESS → GREASE |
|  | [ 1] | (n) | NOT → GREASY |
|  | [ 9] | (n) | LESS → GREASY |
|  | [ 1] | (n) | ARENT → GREASY |
|  | [ 1] | (n) | WOULDN'T → GREASY |
|  | [ 1] | (n) | NOT HAVE → GREASY |
|  | [ 1] | (n) | WOULDN'T LIKE → GREASY |
|  | [ 1] | (n) | WILL LESS → GREASY |
|  | [ 1] | (n) | LESS TOO → GREASY |
|  | [ 1] | (n) | LESS → OIL |
|  | [ 1] | (n) | USE CORN → OIL |
|  | [ 1] | (n) | HOPE COOK VEG → OIL |
|  | [ 1] | (n) | NOT → OILY |
|  | <<26>> |  | total |

A typical word dictionary, by word type, in accordance with the present invention is also given below in Tables H-M.

TABLE H

Dictionary: Words Class For This Page: [SKIP]

| | | | | |
|---|---|---|---|---|
| A | ABOUT | ACTUALLY | AGAIN | ALL |
| ALSO | AM | AN | ANY | ARE |
| AS | AT | AWAY | AWHILE | BASICALLY |
| BECAUSE | BEEN | BEFORE | BEGIN | BEING |
| BETWEEN | BLE | BOTH | BY | CHAINS |
| CHARGED | COME | COMES | COMPANY | CONSIDERING |
| COULD | DEAL | DESCRIBED | DETERMINE | DID |
| DO | DOES | DOING | DUE | ECT |
| ENOUGH | ESPECIALLY | EVEN | EVER | EXACTLY |
| FACT | FACTS | FAR | FOR | FRENCH |
| GENERAL | GET | GOING | GREATLY | HAD |
| HAVING | HOPEFULLY | HOWEVER | HUSBAND | I |
| I'LL | I'M | I'VE | ID | ILL |
| IMAGINE | IN | INGS | IS | IT |
| ITS | IVE | JUST | LEAST | LEVEL |
| MAKING | ME | MEAN | MEANS | MOST |
| MUCH | MY | MYSELF | NECESSARILY | NOR |
| OF | ON | ONES | ONLY | OULD |
| PER | PERHAPS | PERIOD | PLACES | PLUS |
| PREPARATION | PRESENT | PRESUMABLY | PRETTY | PUBLIC |
| REALLY | REGARDLESS | REST | RIES | RIGHT |
| SERVING | SHOULD | SIGNIFICANT | SIMPLY | SINCE |
| SOMETHING | SOMETIMES | SOMEWHAT | SPECIFIECS | START |
| STRICTLY | SUCH | SUPPOSE | SUPPOSEDLY | THAN |
| THAT'S | THE | THEIR | THEM | THEN |
| THEREFORE | THERES | THESE | THEY | THEY'RE |
| THEYRE | THING | THIS | THOSE | TIMES |
| TOLD | TWICE | UNLESS | US | VERY |
| WAY | WE | WERE | WHAT'S | WHENEVER |
| WHICH | WHO | WHOS | WISH | WITH |
| YOUR | | | | |

TABLE I

Dictionary: Words Class For This Page: [CONNECTOR]

| | | | | |
|---|---|---|---|---|
| ALTHOUGH | AND | BUT | OR | THOUGH |

TABLE J

Dictionary: Words Class For This Page: [MODIFIER]

| | | | | |
|---|---|---|---|---|
| TACO | 10 | 100 | 20 | 33 |
| 5 | 50 | 60 | 75 | ABOVE |

TABLE J-continued

| Dictionary: | Words Class For This Page: | | [MODIFIER] | |
|---|---|---|---|---|
| ADD | ADDED | ADDING | ADDITION | ADDITIONAL |
| AFFRAID | AFRAID | AFTER | AGREE | ALONG |
| ALTER | ALTERNATE | ALTERNATIVES | ALWAYS | AMOUNT |
| ANOTHER | ANSWER | ANYTHING | ANYWHERE | APPEALING |
| ARTIFICIAL | ASSUME | AWFUL | BAD | BEATS |
| BEEF'N | BELIEVE | BENEFICIAL | BEST | BETTER |
| BIT | BLAND | BO | BOARDWALK | BOTHER |
| BRAZER | BROWNS | BUD | BURGER | BUYING |
| CAN | CAPTAIN | CAPTURE | CARDIO | CARE |
| CARLS | CARRY | CENT | CERTAIN | CERTAINLY |
| CHEAPER | CHICKEN | CHOOSE | CHURCH'S | CLEAN |
| CLOG | CLOGGED | COMBO | COMMENTS | COMPARE |
| COMPOSED | CONCENTRATIO | CONCERN | CONCERNED | CONFUSING |
| CONSIDER | CONTAIN | CONTAINER | CONTENT | CONTINUE |
| COOKED | CORN | CORRECT | COUNT | COUNTRY |
| CURRENT | CUT | CUTTING | DIARY | DANGER |
| DECREASING | DEEP | DEFINITE | DEFINITELY | DEPENDING |
| DESCRIPTION | DESIRABLE | DESPITE | DIETETIC | DIETING |
| DIFFERENT | DISCONTINUE | DISLIKE | DISTANT | DOCTORS |
| DOGS | DOUGLAS | E | EACH | EASIER |
| EITHER | EMPTY | ENJOY | ENTICE | EVERY |
| EXACT | EXTRA | EXTREMELY | FACTOR | FAIRLY |
| FAMILY | FAN | FASHIONED | FAST | FATTY |
| FAVORITE | FEEL | FEW | FEWER | FIND |
| FIRED | FIRM | FIRST | FIVE | FOND |
| FREE | FRESH | FRIED | FRIEND | FULL |
| GAIN | GAINED | GAINING | GETS | GETTING |
| GIVEN | GIVING | GO | GOLDEN | GOOD |
| GREATER | GROWN | HARD | HATE | HAVE |
| HEAR | HEARD | HECKELS | HELP | HESITATE |
| HIGHER | HOLIDAY | HOME | HOPE | HOT |
| IF | IMPORTANT | IMPROVE | IMPROVED | INC |
| INCREASE | INCREASED | INDUCE | INSTEAD | INSURE |
| JACK | JOHN | JUDGE | JUDGEMENT | KEEN |
| KENTUCKY | KIND | KINDS | KNOWING | KNOWN |
| LATER | LEERY | LEFT | LESS | LESSENING |
| LET | LIGHT | LIGHTER | LIKE | LIKED |
| LITTLE | LOCAL | LONG | LONGER | LOOSE |
| LOSS | LOT | LOTS | LOW | LOWER |
| MAKE | MAKES | MANY | MARKETING | MATTER |
| MAY | MAYBE | MED | MESSY | METHOD |
| MIGHT | MIND | MINOR | MONO | MONTH |
| MR | MUST | N' | NASTY | NATURAL |
| NEED | NEGATIVE | NEITHER | NEVER | NEW |
| NON | NOW | NUT | OFFER | OFFERED |
| OLD | ONCE | ONE | ONION | OPINIONS |
| OTHER | OTHERS | OUT | OUTLET | OUTSIDE |
| OVERLY | OVERWEIGHT | PATIENTS | PAYING | PEELS |
| PERMITTED | PHASED | PICKY | PIECE | PIZZA |
| PLEASE | POCKET | POLY | POOR | POSSIBLE |
| POTATO | PREMIUM | PREVIEW | PREVIOUS | PRIME |
| PROBABLY | PROBLEM | PRODUCTS | PROMISE | PRONE |
| PURCHASE | PURGERS | QUESTION | QUESTIONABLE | QUESTIONS |
| QUITE | RAISE | RAISED | RAISING | RARELY |
| RAW | REACTIONS | REAL | REASON | REASONABLE |
| REDUCED | REDUCING | REDUCTION | REGULAR | REMEMBER |
| REPLACE | RESTAURANT | RESTAURANTS | RESTRICTIONS | RID |
| RUN | SAME | SANCTION | SATISFIED | SATISFY |
| SAW | SAY | SCREEN | SEE | SEEMS |
| SERVE | SEVERAL | SHARES | SHORT | SKEPTICAL |
| SMALL | SMALLER | SMOKE | SOAKED | SODIUM |
| SOMEHOW | SOMEONE | SOONER | SOUNDS | SOYBEAN |
| SPECIALLY | SPECIFIC | SS | STAND | STATED |
| STATION | STAY | STEAK | STORE | STRICT |
| SUBWAY | SUFFER | SUPER | SURE | TACO |
| TAKEN | TERRIFIC | TEST | TESTING | THIN |
| THINK | THOUGHT | TILL | TIME | TOO |
| TRUTHFUL | TWO | UNFAMILIAR | UNKNOWN | UNPLEASANT |
| UNSURE | UNTIL | UP | UPPING | USE |
| USUALLY | VASCULAR | VEG | VEGETABLE | W |
| WASTE | WATCH | WATCHER | WEDGES | WELL |
| WAHTEVER | WHEN | WHITE | WHY | WILL |
| WITHOUT | WOMEN | WONDER | WONDERFUL | WORRIED |
| WORSE | WORTH | WRONG | YET | YOU |

TABLE L

| Dictionary: | Words Class For This Page: | | [NEGATIVE] | |
|---|---|---|---|---|
| AINT | AREN'T | ARENT | CAN'T | CANT |

TABLE L-continued

Dictionary: Words Class For This Page: [NEGATIVE]

| | | | | |
|---|---|---|---|---|
| DID'T | DIDNT | DOESN'T | DOESNT | DON'T |
| HAVEN'T | HAVENT | ISNT | NO | NOT |
| WERENT | WON'T | WONT | WOULDN'T | WOULDNT |

TABLE M

Dictionary: Words Class For This Page: [UKNOWN]

| | | | | |
|---|---|---|---|---|
| 3 | 3042706 | 6 | AFT | DEE'S |
| DON | DONALD'S | DONALDS | ETC | JU |
| ND | RENT | RY | S | SE |
| ST | T | | | |

As was previously mentioned, preferably synonyms are given the same work ID in the dictionary. An example of such synonym usage is given below in Table N.

TABLE N

Dictionary:

| | | | |
|---|---|---|---|
| Use | AND | in place of | ANF |
| | | | ANDIF |
| Use | AREN'T | in place of | AN'T |
| Use | AVAILABLE | in place of | AVAILABILITY |
| | | | AVAILA |
| Use | BAD | in place of | BADFOR |
| Use | CALORIE | in place of | CAL |
| Use | CALORIES | in place of | CALROIES |
| | | | CALORIECOUNT |
| Use | CARL's | in place of | HARLS |
| Use | CHARGE | in place of | CGARGE |
| Use | CHICKEN | in place of | CHICK |
| | | | CHIC |
| Use | CHOICE | in place of | CHOISE |
| Use | CHOLESTEROL | in place of | CHOLESTEROLA |
| | | | CHOLESTERAL |
| | | | CHOLESTROL |
| | | | COLESTERAL |
| | | | CHLORESTERAL |
| Use | COST | in place of | THCOST |
| Use | CURRENT | in place of | CUR |
| | | | CCURRENT |
| | | | CURRET |
| Use | DEEP | in place of | DEEPED |
| Use | DEPENDS | in place of | DEPENS |
| Use | DIFFERENT | in place of | DIFFIRENT |
| Use | DISLIKE | in place of | DISLOKES |
| Use | DOESNT | in place of | ITDOESN'T |
| Use | FAT | in place of | FATE |
| Use | FOR | in place of | FO |
| Use | FRENCH | in place of | FENCH |
| | | | FRENCG |
| Use | FRIES | in place of | F |
| | | | FF |
| | | | FRYS |
| | | | FF'S |
| Use | FRY | in place of | FRIE |
| Use | GOOD | in place of | NUCE |
| Use | I | in place of | O |
| Use | IN | in place of | IIN |
| Use | INCREASE | in place of | INCREA |
| Use | JOHN | in place of | JHONS |
| Use | LESS | in place of | LEASS |
| Use | LONG | in place of | ONG |
| Use | LOW | in place of | LO |
| Use | MAKE | in place of | MAKEIT |
| Use | MCDONALD'S | in place of | MICKIE |
| Use | MCDONALD | in place of | MC |
| | | | MAC |
| | | | MCDONALD |
| Use | ME | in place of | TOME |
| Use | NOT | in place of | AREN |
| Use | NOTHING | in place of | NOTHIBG |
| Use | OR | in place of | ORTHE |
| Use | POTATO | in place of | POTATOE |
| Use | PREMIUM | in place of | APREMIUM |
| Use | PRICE | in place of | PRIECE |
| Use | REGULAR | in place of | REG |
| | | | REGULAT |

TABLE N-continued

Dictionary:

| | | | |
|---|---|---|---|
| Use | SELL | in place of | SELLINGTHE |
| Use | TASTING | in place of | FASTING |
| Use | THAT | in place of | THA |
| Use | THE | in place of | HE |
| Use | TWO | in place of | 2 |
| Use | UNLESS | in place of | UNLEDD |
| Use | WANT | in place of | WAANT |
| Use | WEIGHT | in place of | EWIGHT |
| Use | WENDY'S | in place of | WENDY |
| Use | WORTH | in place of | WORTHIT |
| Use | WOULDNT | in place of | WOULDN |

By utilizing the above method and system of the present invention, open-ended respondent answers to open-ended questions may be processed in a data processor to provide reproducible categorized dynamically variable coding of the open-ended responses.

What is claimed:

1. A method for processing in a data processor having an associated display means open-ended respondent answers to open-ended questions for providing reproducible categorized dynamically variable coding of said open-ended respondent answers to said open-ended questions, said data processor having a retrievable word dictionary of words stored therein, said open-ended answers comprising words, said method comprising the steps of inputting said words comprising an open-ended respondent answer to said data processor, classifying said words comprising said input open-ended respondent answer into corresponding word types selected from a group of word types comprising keywords, modifier words, skip words, connector words and negative words, said keywords comprising words which are keys to conveying a true meaning of said input open-ended respondent answer, said modifier words comprising words attached to said keywords in said input open-ended respondent answer to form key phrases, said skip words comprising words unimportant to said conveying of said true meaning of said input open-ended respondent answer, said connector words comprising words which are conjunctions which connect said key phrases within said input open-ended respondent answer, said negative words comprising words which turn said key phrases into negative statements in said input open-ended respondent answers;

updating said word dictionary;

converting said words comprising said input open-ended respondent answer into corresponding binary coded words, said word dictionary comprising dictionary words stored as corresponding binary coded words, said converting step comprising the step of converting said input words into said corresponding binary coded words corresponding to said binary coded words stored as said updated dictionary words for providing a binary defined sentence corresponding to said input open-ended respondent answer;

scanning said corresponding binary defined sentence and extracting said keywords and said modifier words associated with said keywords in said corresponding binary defined sentence;

creating a retrievable file comprising key phrases formed from said extracted keywords and said extracted associated modifier words, and said keywords per se;

sorting said key phrases in said created file;

counting occurrences of said sorted key phrases and eliminating duplicates in said sorted key phrases for providing a net key phrase file;

displaying said net key phrase file on said associated display means;

grouping said displayed net key phrases into a coding structure; and storing said coding structure in said data processor.

2. A method in accordance with claim 1 further comprising the step of updating said stored coding structure in said data processor for providing an accumulative coding structure for said input open-ended respondent answers.

3. A method in accordance with claim 2 further comprising the step of varying the coding structure of at least one of said net key phrases.

4. A method in accordance with claim 1 comprising performing said classifying step, dictionary updating step converting step, scanning step, file creating step, sorting step, counting step, displaying step, grouping step, and coding structure storing step, for each of a plurality of said open-ended respondent answers input to said data processor for providing an accumulative coding structure for said plurality of input open-ended respondent answers.

5. A method in accordance with claim 4 further comprising the step of updating said stored coding structure in said data processor for each input open-ended respondent answer for providing said accumulative coding structure.

6. A method in accordance with claim 5 further comprising the step of varying the coding structure of at least one of said net key phrases.

7. A method in accordance with claim 4 further comprising the step of varying the coding structure of at least one of said net key phrases.

8. A method in accordance with claim 4 wherein each input open-ended respondent answer is associated with a respondent identification code.

9. A method in accordance with claim 8 further comprising the step of inputting respondent closed-end respondent answers to said data processor, each of said closed-end respondent answers being associated with a respondent identification code.

10. A method in accordance with claim 9 further comprising the step of merging said input closed-end answer with said coded input respondent open-ended answers in accordance with said associated respondent identification codes for accumulatively processing both said open-ended and closed-ended respondent answers.

11. A method in accordance with claim 10 wherein said input closed-end respondent answers comprise pre-coded responses.

12. A method in accordance with claim 1 further comprising the step of varying the coding structure of at least one of said net key phrases.

13. A method in accordance with claim 1 wherein said extracting step comprises the step of extracting said keywords and said associated modifier words in said corresponding binary defined sentence in accordance with a pre-defined rule structure for interpreting said sentence.

14. A method in accordance with claim 13 wherein said extracting step further comprises the step of dynamically modifying said pre-defined rule structure for overriding said pre-defined rule structure for extracting said keywords and said associated modifier words in accordance with said dynamically modified rule structure.

15. A method in accordance with claim 13 wherein said pre-defined rule structure comprises a rule that every sentence must have at least one of said keywords.

16. A method in accordance with claim 15 wherein said pre-defined rule structure further comprises a rule that skip words and words which are unknown from said dictionary are ignored.

17. A method in accordance with claim 16 wherein said pre-defined rule structure further comprises a rule that two of said keywords may not exist next to each other and must be separated by at least one modifier word or connector word.

18. A method in accordance with claim 17 wherein said pre-defined rule structure further comprises a rule that a key phrase may comprise one keyword, O-n preceding modifier words and a preceding negative word.

19. A method in accordance with claim 18 wherein said pre-defined rule structure further comprises a rule that a connector word must have a key phrase on the left and right of said connector word.

20. A method in accordance with claim 19 wherein said pre-defined rule structure further comprises a rule that any trailing modifier words are attached to the preceding keyword.

21. A method in accordance with claim 20 wherein said extracting step further comprises the step of dynamically modifying said pre-defined rule structure for overriding said pre-defined rule structure for extracting said keywords and said associated modifier words in accordance with said dynamically modified rule structure.

22. A method in accordance with claim 20 comprising performing said classifying step, dictionary updating step converting step, scanning step, file creating step, sorting step, counting step, displaying step, grouping step, and coding structure storing step, for each of a plurality of said open-ended respondent answers input to said data processor for providing an accumulative coding structure for said plurality of input open-ended respondent answers.

23. A method in accordance with claim 22 further comprising the step of updating said stored coding structure in said data processor for each input open-ended respondent answer for providing said accumulative coding structure.

24. A method in accordance with claim 20 wherein each input open-ended respondent answer is associated with a respondent identification code.

25. A method in accordance with claim 24 further comprising the step of inputting respondent closed-end respondent answers to said data processor, each of said closed-end respondent answers being associated with a respondent identification code.

26. A method in accordance with claim 25 further comprising the step of merging said input closed-end answer with said coded input respondent open-ended answers in accordance with said associated respondent identification codes for accumulatively processing both said open-ended and closed-ended respondent answers.

27. A method in accordance with claim 36 wherein said input closed-end respondent answers comprise pre-coded responses.

28. A method in accordance with claim 24 all commas are replaced by the AND connector word.

29. A method in accordance with claim 28 further comprising the step of inputting respondent closed-end respondent answers to said data processor, each of said closed-end respondent answers being associated with a respondent identification code.

30. A method in accordance with claim 29 further comprising the step of merging said input closed-end answer with said coded input respondent open-ended answers in accordance with said associated respondent identification codes for accumulatively processing both said open-ended and closed-end respondent answers.

31. A method in accordance with claim 30 wherein said put closed-end respondent answers comprise pre-coded responses.

32. A method in accordance with claim 19 wherein said pre-defined rule structure comprising a rule that all commas are replaced by the AND connector word.

33. A method in accordance with claim 32 wherein said extracting step further comprises the step of dynamically modifying said pre defined rule structure for overriding said pre-defined rule structure for extracting said keywords and said associated modifier words in accordance with said dynamically modified rule structure.

34. A method in accordance with claim 32 comprising performing said classifying step, dictionary updating step converting step, scanning step, file creating step, sorting step, counting step, displaying step, grouping step, and coding structure storing step, for each of a plurality of said open-ended respondent answers input to said data processor for providing an accumulative coding structure for said plurality of input open-ended respondent answers.

35. A method in accordance with claim 34 further comprising the step of updating said stored coding structure in said data processor for each input open-ended respondent answer for providing said accumulative coding structure.

36. A method in accordance with claim 1 wherein each input open-ended respondent answer is associated with a respondent identification code.

37. A method in accordance with claim 36 further comprising the step of inputting respondent closed-end respondent answers to said data processor, each of said closed-end respondent answers being associated with a respondent identification code.

38. A method in accordance with claim 37 further comprising the step of merging said input closed-end answer with said coded input respondent open-ended answers in accordance with said associated respondent identification codes for accumulatively processing both said open-ended and closed-end respondent answers.

39. A method in accordance with claim 38 wherein said input closed-end respondent answers comprise pre-coded responses.

40. A method in accordance with claim 37 wherein said put closed-end respondent answers comprise pre-coded responses.

41. A data processor system for processing open-ended respondent answers to open-ended questions for providing reproducible categorized dynamically variable coding of said open-ended respondent answers to said open-end questions, said data processor system comprising display means for providing a display, means for retrievably storing a dictionary of words, said open-ended answers comprising words; means for inputting said words comprising an open-ended respondent answer to said data processor; means for classifying said words comprising said input open-ended respondent answer into corresponding word types selected from a group of word types comprising keywords, modifier words, skip words, connector words and negative words, said keywords comprising words which are keys to conveying a true meaning of said input open-ended respondent answer, said modifier words comprising words attached to said keywords in said input open-ended respondent answer to form key phrases, said skip words comprising words unimportant to said conveying of said true meaning of said input open-ended respondent answer, said connector words comprising words which are conjunctions which connect said key phrases within said input open-ended respondent answer, said negative words comprising words which turn said key phrases into negative statements in said input open-ended respondent answers; means for updating said word dictionary means for converting said words comprising said input open-ended respondent answer into corresponding binary coded words, said word dictionary comprising dictionary words stored as corresponding binary coded words, said converting means comprising means for converting said input words into said corresponding binary coded words corresponding to said binary coded words stored as said updated dictionary words for providing a binary defined sentence corresponding to said input open-ended respondent answer; means for scanning said corresponding binary defined sentence and extracting said keywords and said modifier words associated with said keywords in said corresponding binary defined sentence; means for creating a retrievable file comprising key phrases formed from said extracted keywords and said extracted associated modifier words, and said keywords per se; means for sorting said key phrases in said created file; means for counting occurrences of said sorted key phrases and eliminating duplicates in said sorted key phrases for providing a net key phrase file, said net key phrase file being displayable on said associated display means; means for grouping said displayed net key phrases into a coding structure; and means for storing said coding structure in said data processor system.

42. A system in accordance with claim 41 further comprising means for varying the coding structure of at least one of said net key phrases.

43. A system in accordance with claim 41 wherein said means for extracting said keywords and said associated modifier words in said corresponding binary defined sentence comprises means for extracting said keywords and said associated modifier words in accordance with a pre-defined rule structure for interpreting said sentence.

44. A system in accordance with claim 43 wherein said pre-defined rule structure comprises a rule that every sentence must have at least one of said keywords.

45. A system in accordance with claim 44 wherein said pre-defined rule structure further comprises a rule that skip words and words which are unknown from said dictionary are ignored.

46. A system in accordance with claim 45 wherein said pre-defined rule structure comprises a rule that two of said keywords may not exist next to each other and must be separated by at least one modifier word or connector word.

47. A system in accordance with claim 46 wherein said pre-defined rule structure comprises a rule that a key phrase may comprise one keyword, O-n preceding modifier words and a preceding negative word.

48. A system in accordance with claim 47 wherein said pre-defined rule structure comprises a rule that a connector word must have a key phrase on the left and right of said connector word.

49. A system in accordance with claim 48 wherein said pre-defined rule structure comprises a rule that any trailing modifier words are attached to the preceding keyword.

50. A system in accordance with claim 49 wherein said pre-defined rule structure comprises a rule that all commas are replaced by the AND connector word.

51. A system in accordance with claim 43 wherein said pre-defined rule structure comprises a rule that further comprises means for inputting respondent closed-end answers to said data processor system, and means for merging said input respondent closed-end answers with said coded input respondent open-ended answers for accumulatively processing both said open-ended and closed-ended respondent answers.

* * * * *

UNITED STATES PATENT AND TRADEMARK OFFICE
CERTIFICATE OF CORRECTION

PATENT NO. : 4,958,284

DATED : September 18, 1990

INVENTOR(S) : BISHOP et al.

It is certified that error appears in the above-identified patent and that said Letters Patent is hereby corrected as shown below:

Abstract, line 2:  Change "provides" to --for providing--.

Abstract, line 6:  Change "fo" to --of--.

Abstract, line 13:  Change convered" to --converted--.

Column 1, line 12:  Change "Survey" to --survey--.

Column 3, line 41:  Change "ar" to --are--.

Column 4, line 50:  Change "sentence" to --sentences--.

Column 6, Table A, line 10:  Change "--→ TASTE" to --GREAT--? TASTE--.

UNITED STATES PATENT AND TRADEMARK OFFICE
CERTIFICATE OF CORRECTION

PATENT NO. : 4,958,284

DATED : September 18, 1990

INVENTOR(S) : BISHOP, et al.

It is certified that error appears in the above-identified patent and that said Letters Patent is hereby corrected as shown below:

Column 17, Table M, line 1: Change "UKNOWN" to --UNKNOWN--.

Column 17, line 17: Change "work" to --word--.

Column 21, line 18: Change "put" to --input--.

Column 21, line 25: Change "pre defined" to --pre-defined--.

Column 22, line 23: Between "dictionary" and "means", insert a semicolon (;).

Signed and Sealed this

Thirteenth Day of October, 1992

*Attest:*

DOUGLAS B. COMER

*Attesting Officer*  *Acting Commissioner of Patents and Trademarks*

UNITED STATES PATENT AND TRADEMARK OFFICE
CERTIFICATE OF CORRECTION

PATENT NO.: 4,958,284

DATED: September 18, 1990

INVENTOR(S): BISHOP et al.

It is certified that error appears in the above-identified patent and that said Letters Patent is hereby corrected as shown below:

Column 2, line 64: Change "a" to --as--.

Column 4, Table, line 9: Change "preferrably" to --preferably--.

Column 6, line 26: After "responses", insert a comma (,).

Column 9, Table C, line 17: Change "( )" to --(n)--.

Column 9, Table D, line 7: Change "( )" to --(n)--.

Column 9, Table D, line 9: Change "FIRES" to --FRIES--.

Column 11, Table E, line 1: Change "NET #:4" to --NET #:5--.

Column 12, Table F, line 12: Change "RESTUARANT" to --RESTAURANT--.

Column 13, Table H, line 24: Change "SPECIFIECS" to --SPECIFICS--.

Column 15, Table J, (cont'd), line 17: Change "DIARY" to --DAIRY--.

Column 15, Table J, (cont'd), line 73: Change "WAHTEVER" to --WHATEVER--.

Column 17, Table L, (cont'd), line 2: Change "DID'T" to --DIDN'T--.

Column 17, Table M, line 1: Change "UKNOWN" to --UNKNOWN--.

UNITED STATES PATENT AND TRADEMARK OFFICE
CERTIFICATE OF CORRECTION

PATENT NO. : 4,958,284

DATED : September 18, 1990

INVENTOR(S): BISHOP et al.

It is certified that error appears in the above-identified patent and that said Letters Patent is hereby corrected as shown below:

Column 20, line 43: Between "step" and "converting", insert a comma (,).

Column 21, line 7: Between "inputting" and "closed-end", delete "respondent".

Column 21, line 32: Between "step" and "converting", insert a comma (,).

Signed and Sealed this

Twenty-third Day of February, 1993

Attest:

STEPHEN G. KUNIN

Attesting Officer

Acting Commissioner of Patents and Trademarks